United States Patent [19]

Gross et al.

[11] 4,282,084

[45] Aug. 4, 1981

[54] CATALYTIC CRACKING PROCESS

[75] Inventors: Benjamin Gross; Wooyoung Lee, both of Cherry Hill, N.J.

[73] Assignee: Mobil Oil Corporation, New York, N.Y.

[21] Appl. No.: 137,877

[22] Filed: Apr. 7, 1980

Related U.S. Application Data

[60] Continuation of Ser. No. 946,004, Sep. 27, 1978, abandoned, which is a continuation of Ser. No. 830,955, Sep. 6, 1977, abandoned, which is a continuation of Ser. No. 651,109, Jan. 21, 1976, abandoned, which is a continuation-in-part of Ser. No. 529,055, Dec. 3, 1974, Pat. No. 3,960,707, which is a division of Ser. No. 472,525, May 23, 1974, abandoned.

[51] Int. Cl.³ .............................................. C10G 11/18
[52] U.S. Cl. ............................ 208/113; 208/DIG. 1; 208/120; 208/164
[58] Field of Search .......... 208/120, 124, 164, DIG. 1

[56] References Cited

U.S. PATENT DOCUMENTS

| | | | |
|---|---|---|---|
| 3,175,968 | 3/1965 | Berger | 208/164 |
| 3,261,771 | 7/1966 | Iscol et al. | 208/113 |
| 3,364,136 | 1/1968 | Chen et al. | 208/120 |
| 3,384,573 | 5/1968 | Gorring | 208/113 |
| 3,960,707 | 1/1976 | Gross et al. | 208/164 |
| 4,072,600 | 2/1978 | Schwartz | 208/164 |

*Primary Examiner*—Delbert E. Gantz
*Assistant Examiner*—G. E. Schmitkons
*Attorney, Agent, or Firm*—C. A. Huggett; M. G. Gilman; V. J. Frilette

[57] ABSTRACT

An improved catalytic process wherein trace amounts of a metal of period 5 and 6 of Group VIII or rhenium is added to the total catalyst inventory for cracking of gas oil is disclosed. With this improved process, the yield of gasoline, fuel oil, total cracked products, or predetermined combinations thereof, is maximized for the fluid catalytic cracking of any predetermined feed, usually a gas oil. The process employs a kinetic predictive or a correlative model of the cracking process to identify proper operating conditions, including $CO_2/CO$ ratio in the effluent from the regenerator, and also requires control of the metal activity to achieve optimal conversion of CO to $CO_2$ in the regenerator.

Also disclosed is an improved method for control of a fluid catalytic process wherein the cracking catalyst comprises trace amounts of a metal selected from the group Pt, Pd, Rh, Ru, Ir, Os and Re.

12 Claims, 17 Drawing Figures

TYPICAL EFFECT of $CO_2$/CO RATIO on FCC PERFORMANCE

OPERATING MAP for COMMERCIAL FCC UNIT

OPERATING MAP for COMMERCIAL FCC UNIT

COMMERCIAL UNIT – PARTIAL CO BURNING TEST

REGENERATOR BEHAVIOR for TWO LEVELS of CATALYTIC CO BURNING ACTIVITY

CO$_2$/CO RATIO versus TEMPERATURE FOR WELL MIXED DENSE BED (Two Levels of CO Burning Activity)

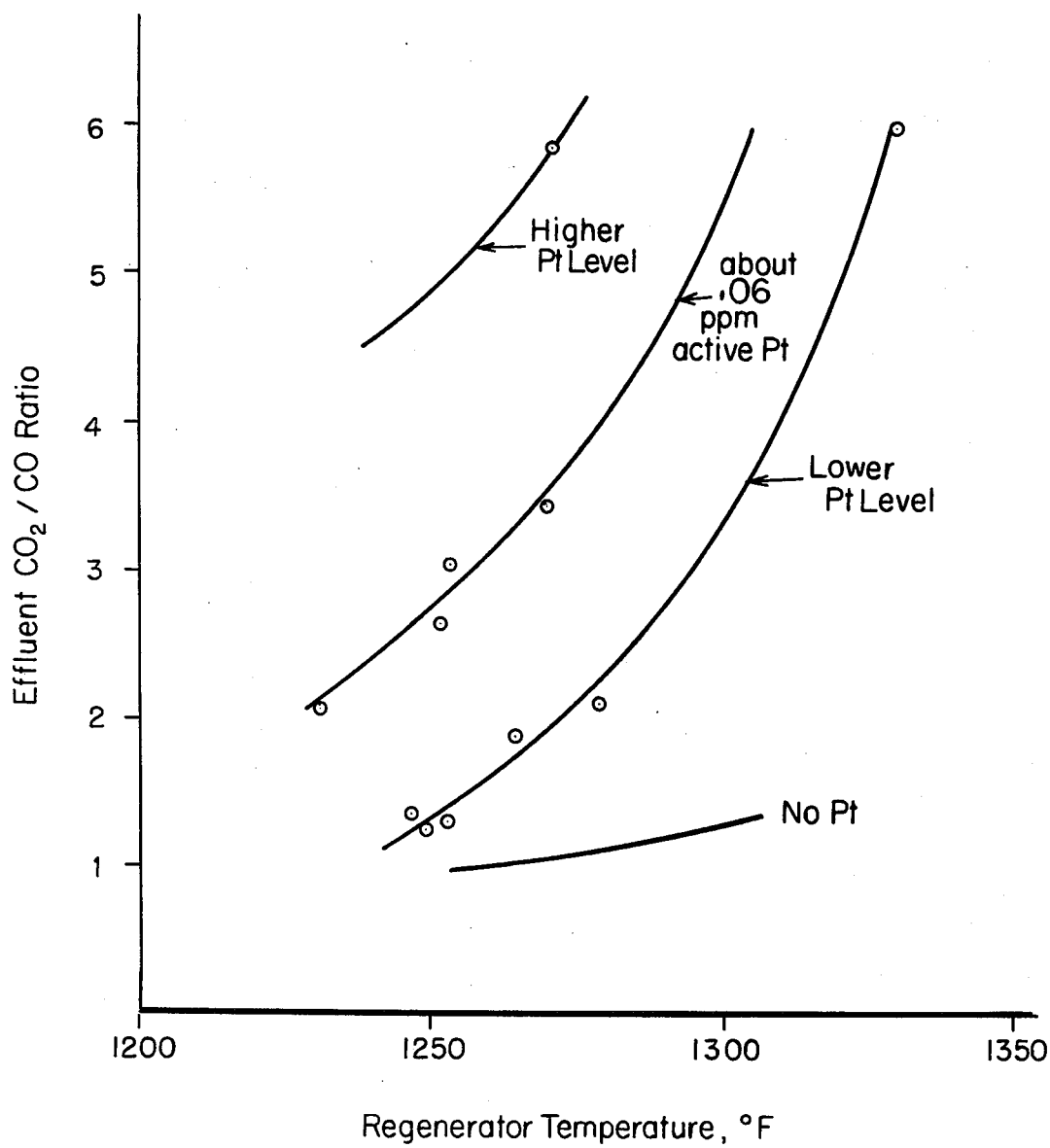

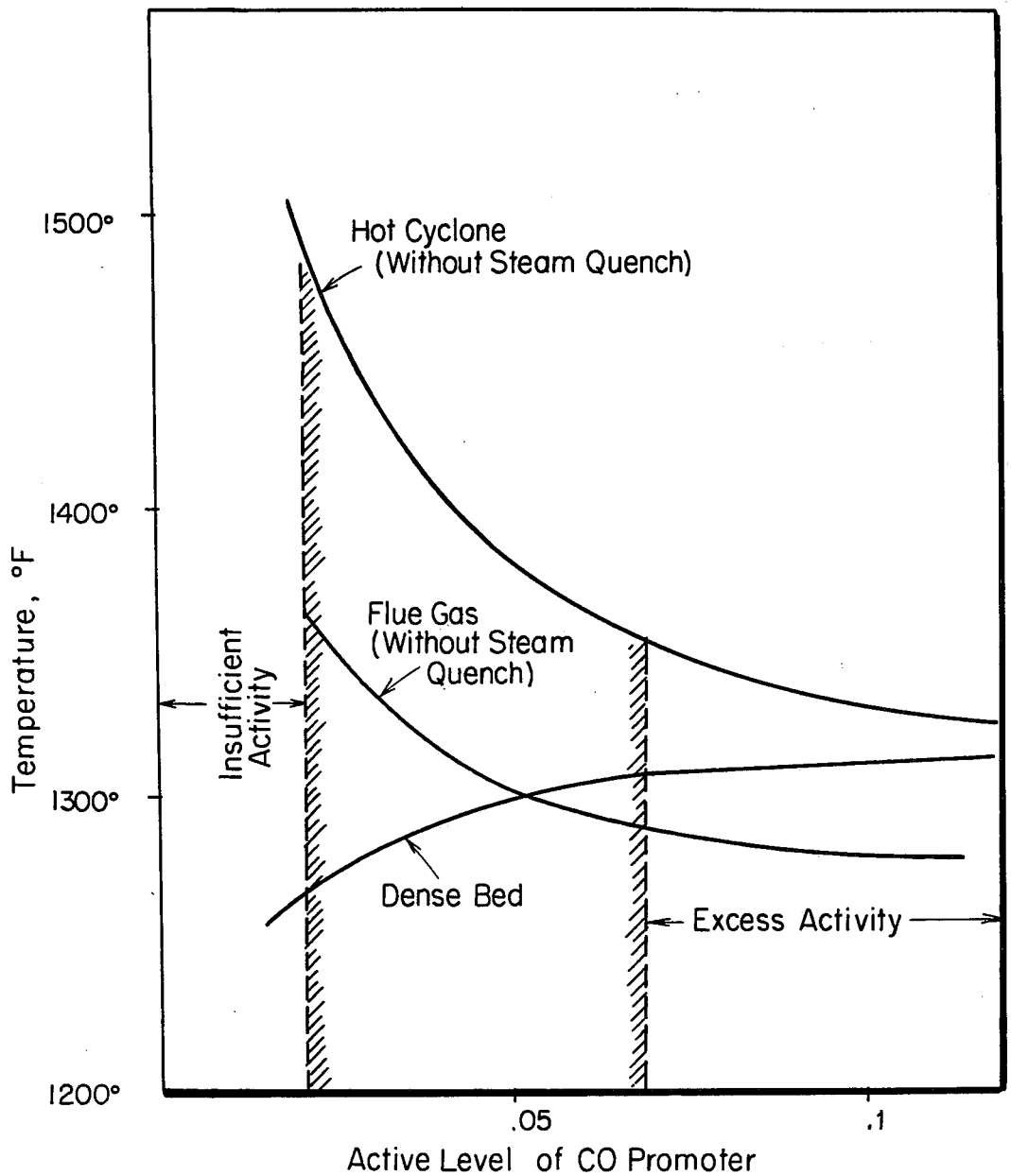

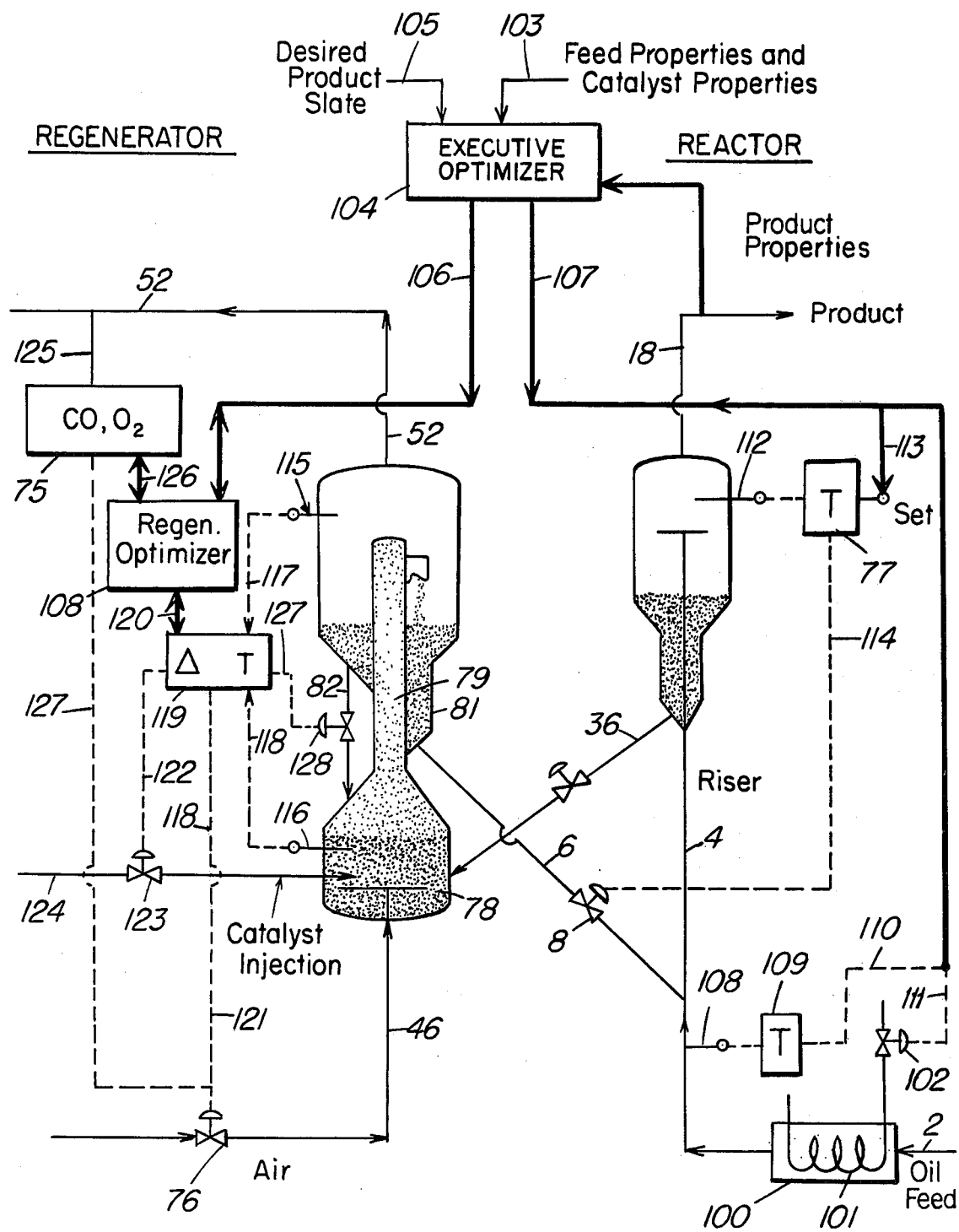

CATALYTIC CRACKING PROCESS

This application is a continuation of Patent Application Ser. No. 946,004 filed Sept. 27, 1978 (now abandoned), which in turn is a continuation of patent application Ser. No. 830,955 filed Sept. 6, 1977, (now abandoned) which in turn is a continuation of patent application Ser. No. 651,109 filed Jan. 21, 1976 (now abandonded). Other pertinent applications are patent application Ser. No. 529,055 filed Dec. 3, 1974, now U.S. Pat. No. 3,960,707 which is a division of patent application Ser. No. 472,525 filed May 23, 1974 (now abandoned), the entire contents of said patent applications being incorporated herein by reference.

BACKGROUND OF THE INVENTION

In the commercial cracking of gas oils to produce hydrocarbons boiling in the motor fuel range, there are a wide variety of reactions which take place, some of which are desirable, and some of which are undesirable. It is believed that the refiner today strikes a compromise between the desirable reactions and the undesirable reactions which are taking place, and the basis of such compromise varies from situation to situation and from refiner to refiner. It is simple to state that a refiner desires to make the maximum amount of desirable products, and yet to accomplish this in an economically favorable manner. However, when the above simple statement is buttressed against economic reality, compromises must be made. Thus, for example, a process which yields the maximum amount of gasoline from a barrel of crude oil is not necessarily the most economically attractive one at any given location, for the simple reason that such a process might require a catalyst which must be subjected to more frequent regenerations, or said process might simply bear too heavy an economic penalty as compared to a process which produces slightly less gasoline from a given barrel of crude, but at cheaper cost. Thus, the typical refiner of today is constantly compromising between the most effective manner of carrying out a desired reaction and the practicality of such desired reaction based on such ever-changing factors as the nature and type of the crude being used, the particular market value of the various products which can be obtained from the crude, the cost and nature of the catalyst which is being used, the availability and constraints caused by existing equipment, and quite recently, by restraints imposed by the Environmental Protection Agency with respect to certain emission standards. It also appears quite obvious that these various compromises will become even more troublesome in the future due to the dependency upon foreign crude and the fact that the most desirable feed for a particular operation may not be available or may be available at too high a cost, such that careful balances must be struck between obtaining the maximum amount of useful products from a barrel of crude so as to minimize our dependency upon foreign crude and accomplishing the same as to optimize the economic aspects of the operation and comply with the various regulations with respect to pollution primarily with respect to the nature and extent of contaminants which are released to the atmosphere.

COMMERCIAL CRACKING PROCESSES

In general, commercial operations with regard to the cracking of gas oils can be placed into two broad categories which are commonly referred to in the art as "cracking" and "hydrocracking". Both these processes have been well defined in the art together with the various reasons why one is preferable over the other in a given situation. It is not the purpose of this invention to discuss the relative merits of cracking and hydrocracking. However, it is important to note that hydrocracking requires the presence of a hydrogenation/dehydrogenation component in a mixture with a cracking catalyst in order for it to function, whereas catalytic cracking does not. In fact, it is well known in the art that the presence of a hydrogenation/dehydrogenation component in a cracking process is detrimental to said process. Thus one of the major advantages of hydrocracking is that because of the presence of a hydrogenation/dehydrogenation component a very small amount of coke is deposited on the catalyst such that the catalyst remains active for prolonged periods of time and does not require regeneration except as long intervals. On the other hand, catalytic cracking inherently results in the deposition of significant coke on a catalyst thereby resulting in a decline of activity of said catalyst which must be compensated for by frequent regeneration of the same by burning off the coke at elevated temperatures in a regenerator. It is also well known in the art that if a hydrogenation/dehydrogenation component is present in a cracking operation, then undesirable increases in coke and hydrogen will result. Thus, the very material or substance which when employed in a hydrocracking operation effectively controls and minimizes the amount of coke which is formed (i.e., the H/D component) accomplishes the reverse result in a cracking reaction. At first blush, this would appear to be contradictory until it is remembered that conditions employed in a hydrocracker are drastically different than the conditions which are employed in a commercial cracking unit. The reason why a hydrogenation component is desirable and necessary in a hydrocracking operation is that such is carried out at conditions wherein the thermodynamics of the system favor desirable reactions. Thus, by way of considerable over-simplification, hydrocracking is carried out at conditions such that the hydrogenation component is made to work to produce desirable reactions. On the other hand, a commercial catalytic cracker involves conditions such that if a hydrogenation component were present the action of the hydrogenation component favors the undesirable reactions, which results in the production of increased coke and increased hydrogen.

If one were to merely consider a catalytic cracking operation from the point of view of theory only, it can well be stated that the presence of a hydrogenation component would be completely undesirable and something to be avoided since the economic penalty posed by increased coke and increased hydrogen production is too high a premium to pay for any conceivable advantage which might be gained by changing the product distribution.

However, it should be immediately realized that it is not possible to consider the cracking reaction only since every commercial cracker has a regenerator wherein the coked catalyst is contacted with an oxygen-containing gas in order to decrease the coke and restore its activity. The regenerating side and the cracking side must be considered together since what happens on the cracking side affects what happens in the regenerating side, and conversely what happens in the regenerator side affects what happens during the cracking cycle.

Heretofore, there has been attention devoted by workers in the art to control the regeneration of a cracking catalyst, and in general it can fairly well be stated that the problem that most frequently occupied workers in the art was to reduce the carbon contamination of the catalyst by combustion of the same without affecting the physical properties of the catalyst. Thus, for example it has long been recognized that certain cracking catalyst, if exposed to extremely high temperatures, become damaged and suffer an irretrievable loss of activity and/or selectivity. Additionally, as it is well recognized in the art, the cracking reaction is an endothermic one and requires heat in order to cause it to take place, and a substantial portion of heat necessary to drive the cracking reaction forward is provided by the heat which is generated by burning off the coke of the contaminated catalyst in the regenerator. In the early developments of the regenerator, the primary consideration was the restoration of the catalyst activity by the removal of coke together with the utilization of heat generated by introduction of hot catalyst into cracking reaction. Additionally, the workers of the art fully appreciated that temperatures in the regenerator should not get so high that the catalyst would become physically damaged.

The art also appreciated that the removal of coke from a catalyst in the presence of oxygen results in the formation of carbon monoxide and carbon dioxide. Further, the art also appreciated that carbon monoxide could itself but further oxidized to carbon dioxide. All these reactions involve the liberation of heat. A problem which developed fairly early in the art particularly with respect to TCC type units was that too much carbon monoxide was present in admixture with oxygen in the regenerator in the effluent gas disengaging devices and in the exhaust ducts, such that the carbon monoxide ignited, thereby liberating additional heat which caused damage not only to the equipment, but also the catalyst. This phenomena was referred to in the art as "afterburning."

Prior art workers approached the problem of controlling afterburning by limiting the temperature by steam injection or by limiting the amount of carbon monoxide in contact with oxygen, such that the oxidation of carbon monoxide to carbon dioxide could not take place. Steam injection in this manner accelerated catalyst deactivation. One very common term employed by most all workers in the prior art was "$CO_2/CO$ ratio." Thus, if the $CO_2/CO$ ratio could be raised, quite obviously, there would be less carbon monoxide present which could react with the excess oxygen thereby eliminating the problem of afterburning. In fact, there have been many traditional approaches along this line, and they all involved the addition of an oxidation component to a cracking catalyst, the theory being that the oxidation catalyst would catalyze the reaction of carbon monoxide to carbon dioxide, thereby avoiding the problem of afterburning. In fact, a commercial catalyst utilizing chromium oxide to accomplish this purpose was developed and is disclosed in U.S. Pat. No. 2,647,860.

It should be apparent that the vast majority, if not all, of the solid oxidation catalysts are also hydrogenation/dehydrogenation catalysts. As has heretofore been pointed out, it is not desirable to have a hydrogenation/dehydrogenation catalyst in a cracking reactor since said material leads to excessive coke and hydrogen formation.

The prior art catalyst represented a compromise between the oxidation function which was desirable, and the hydrogenation/dehydrogenation function which was undesirable.

It should be immediately pointed out that under the goals which existed at the time these prior catalysts were used, they were successful. It is a fact that chromium oxide catalysts did control the $CO_2/CO$ ratio without economically prohibitively affecting the cracking reaction when it is remembered that what was meant by control of the $CO_2/CO$ ratio at that time is not what is meant at the present time. As has been stated, the prior art workers were only concerned with minimizing the problem with afterburning, and such problem is effectively removed when the $CO_2/CO$ ratio is just slightly affected. Thus, chromium oxide catalyst is indeed effective in some cases to alter the $CO_2/CO$ ratio to the point where afterburning does not take place without seriously affecting the cracking reaction. Somewhat the same thing can be said with respect to titanium as is set forth in U.S. No. 3,696,025, i.e., that titanium would enhance or control the $CO_2/CO$ ratio without substantially affecting the cracking reaction if it is remembered that such statement is valid only in the context in which it is made, i.e., there is a limited change in the $CO_2/CO$ ratio. Thus, for example, in U.S. No. 3,696,025 the $CO_2/CO$ ratio is changed from 1.4 to about 2.2.

In recent years a need has arisen to control the $CO_2/CO$ ratio, which has absolutely nothing whatsoever to do with the problem of afterburning, but rather is directly releated to Environmental Regulations enacted by the Federal and/or State Governments concerning emission standards. Thus, there are now regulations which limit the amount of carbon monoxide which can be discharged to the atmosphere and such limitations must be complied with irrespective of whether or not the achievement or attainment of such levels is beneficial or detrimental to the cracking reaction. There have been many proposals made to meet the problem of Emission Standards, the most common one being the provision of a CO boiler, wherein the effluent gas from the regenerator containing the CO is fed to a separate boiler where the CO is burned to $CO_2$ in order to meet Emission Standards. Quite obviously these boilers represent a large additional capital expenditure, and provisions must be made for recovering the heat values integrating them in the overall refinery operation. It is to be pointed out that in order to meet the Emission Standards, the inherently resulting $CO_2/CO$ ratios are nowhere near the ratios contemplated by the prior art. In other words, the amount of carbon monoxide which must be oxidized to carbon dioxide in order to meet Emission Standards is of much greater magnitude than that which was necessary to control afterburning. The problems encountered in meeting Emission Standards and in controlling the afterburning, though similar, are completely and totally unrelated.

More importantly, the prior art catalysts which has been used to control $CO_2/CO$ ratios with respect to afterburning phenomena were already operating at the extreme end of economic practicality, with respect to the enhanced gas make and coke make which they were providing, and yet it was now necessary to convert even more CO to $CO_2$ in order to meet environmental regulations. Quite obviously, the catalysts of the prior art simply cannot affect even more drastic reduction of carbon monoxide without affecting the cracking reaction. Although not wishing to be bound by any theory of operation, the reason is believed to be the fact that the oxidation function of these catalysts is so sufficiently close to the hydrogenation/dehydrogenation activity of these catalysts that any increase in the amount of catalyst in order to enhance the oxidation function will automatically increase the hydrogenation/dehydrogenation function, thereby resulting in a tremendous economic imbalance.

It has recently been found that the use of a metal of periods 6 and 7 from Group VIII of Periodic Table or rhenium permit an effective control of carbon monoxide from the effluent gas of the regenerator while still maintaining excellent gasoline yield without excessive coke and hydrogen make. Quite surprisingly, the above-referred to metals can be introduced into a cracking operation in extremely minute quantities such that they will retain their oxidation function and, yet, have their hydrogenation/dehydrogenation function sufficiently reduced such that they have become an effective tool in the control of carbon monoxide emissions from a commercial cracker. It appears that the specified metals are unique in accomplishing their intended purpose, since it is the only group of catalysts which show the great differential between their oxidizing function and their hydrogenation/dehydrogenation function and said differential remains throughout the range of concentrations contemplated in that invention, described in U.S. patent application Ser. No. 649,261 filed Jan. 15, 1976, the entire contents of which are herein incorporated by reference. According to that invention, carbon monoxide is oxidized to $CO_2$ in the oxidizing atmosphere of a catalytic cracking regenerator at levels of oxidation catalyst which produce in the reactor perturbations of the reaction which are quite tolerable, in the sense that the variations in hydrogen make and coke yield are significantly less than heretofore. In some cases, normal variants of these values due to fluctuations with nature of charge stock and operating conditions are at least as great as those due to the described metal catalyst. Such variations may be accommodated by the design of commercial units and hence the effects of the present catalyst on the cracking side of the cycle are minimized.

The hereinabove described invention involves catalyst-transfer catalytic cracking processes in which cracking is carried out in one or more zones of the unit and the catalyst is transferred continuously from these zones to one or more other zones of the unit where the coke deposit from the cracking reaction is burned off and the catalyst is transferred back to the cracking zones.

In a typical embodiment, that invention is applied for improvement in operation of an FCC type system having riser, fluidized bed or other type of reactor and a regenerator in which there is maintained a dense bed of catalyst fluidized by air with a dilute catalyst phase thereabove. In one type of reactor design, the spent catalyst from the reactor is introduced tangentially to the dense bed of catalyst which is fluidized by regeneration air introduced by a grid below the dense bed. The tangential introduction of spent catalyst induces a swirl in the dense bed whereby the catalyst under regeneration moves in a generally circular path to a discharge port below the dense bed approximately 270° from the catalyst introduction port. A portion of the hot catalyst continues in the swirling pattern to mingle with and aid in ignition of newly added spent catalyst.

The gases passing through and rising from the dense bed carry with them a portion of catalyst entrained from the dense bed, thus producing a dilute phase of suspended catalyst above the dense bed. The dilute phase passes to cyclone separators at the top of the regenerator vessel where catalyst is removed and drops throudh dip legs back to the dense bed, the effluent regeneration gas then passing to a stack for discharge to the atmosphere, usually after recovery of heat values and burning of CO, if necessary.

Carbon monoxide generated in the dense bed by reaction of coke and an oxygen-containing gas in conventional FCC operation will react with excess air in the dilute phase, generating heat. Because of the low catalyst mass in the dilute phase, the temperature in the dilute phase rises substantially, often enough to damage the catalyst present in the dilute phase and subject cyclones to temperatures in excess of that tolerable by the metals used. This increase in temperature above the dense bed is an important parameter in FCC operation. It is commonly reported as the temperature differential ($\Delta T$) between temperatures detected by thermocouples in the dense bed and in the dilute phase. It is conventional to control excess air to maintain $\Delta T$ within tolerable limits.

The invention described in Ser. No. 649,261 filed Jan. 15, 1976 contemplates a modified cracking catalyst capable of inducing combustion of CO in the dense bed where the released heat can be accepted by the large mass of catalyst as sensible heat available for supply of heat of reaction in the cracking reactor. That result is accomplished by supply to the catalyst inventory (catalyst inventory as used herein is defined as total catalyst in the operating unit including reactor, regenerator, transfer lines, stripping zones, etc.) of a small amount of metals of Periods 6 and 7 from Group VIII of the Periodic Table or rhenium. The metal or metals or compounds thereof so supplied is dispersed on the surfaces of porous catalyst in the inventory in a quantity usually less than about 20 parts per million of total catalyst inventory. A minimum value for effective metal to cause increased oxidation of CO in the dense bed may be less than 0.1 ppm and in some cases less than 0.02 ppm. Addition to the inventory of a minor amount of cracking catalyst to which has been added 5 ppm or less of platinum causes immediate, dramatic reduction of $\Delta T$, although the concentration of platinum in the total inventory may be too small for measurement by present analytical techniques. This has been clearly demonstrated in full scale commercial catalytic cracking units.

The immediate or very fast response of FCC Units to addition of platinum and the like in very small amounts is unique. Normally, the commercial units adapt very slowly to changes in operating parameters. With other catalysts it is usually a matter of weeks for a cracker to show effects of a catalyst change.

The form of the added metal or metals is not well understood. It can be expected that platinum and other operative metals will undergo chemical change in the alternating conditions of reducing atmosphere with nitrogen, sulfur and other contaminants in the reactor and oxidizing atmosphere with contaminants in the regenerator.

The CO combustion catalyst hereinabove described permits unexpected variation and control of carbon monoxide burning in the dense bed of the regenerator, permitting the $CO_2/CO$ ratio and the regenerator temperature to be varied over very wide ranges simply by proper choice of catalyst CO activity level in combination with manipulation of air rate, without detrimental effects on the cracking side of the process. This ability to alter the $CO_2/CO$ ratio represents a new dimension of freedom in that a new operating condition, heretofore in effect not controllable, now becomes accessible to change and adjustment.

As is known to those skilled in the art, operation of the FCC process is performed in such a manner as to preserve a heat balance between the reactor section and the regenerator. In practice, this is accomplished by control schemes which cause the reactor section to interact with the regenerator. It has been disclosed that better optimal results could be achieved by "decoupling" the control of the reactor from the control of the regenerator, as described in U.S. Pat. No. 3,769,203 issued Oct. 30, 1973. The new degree of freedom achieved by utilizing the CO combustion catalyst hereinabove described is a novel means for partially decoupling the reactor and the regenerator.

In catalytic cracking processes, particularly with FCC, identifying the particular set of operating conditions that will produce optimal or near optimal results for the combination of a particular feedstock and catalyst and at a particular point in time is a serious concern of the refiner, who is constrained to operate with a particular cracking unit. Although small changes in conversion, yield of gasoline, or gasoline quality may at first glance appear of little moment, consideration of the very large volumes of cracked products that are produced in a modern refinery quickly reveals the importance of achieving optimal results. Most refineries utilize what may be referred to as the Evolutionary Optimization Technique, referred to hereinafter as EVOP, which consists of making sequential small changes in operating conditions and retaining those conditions that appear superior. However, this technique is cumbersome and slow and expensive, and may not reveal the ultimate optimal conditions. Furthermore, as the number of interacting operating conditions increases, as for example when utilizing the CO combustion catalyst as hereinabove describes, the EVOP procedure becomes particular unwieldy.

It is an object of this invention to provide an improved catalytic cracking process wherein a CO combustion catalyst is employed. It is a further object of this invention to provide an FCC process wherein a CO combustion catalyst is employed under optimal operating conditions. It is a further object of this invention to generate optimal operating conditions for a particular FCC unit and the combination of a particular feed and catalyst, utilizing a kinetic predictive model of the FCC process with limited constraint or with no constraint on the $CO_2/CO$ ratio. It is a further object of this invention to generate a procedure for the maintenance of optimal CO combustion catalyst activity in an FCC unit. It is a further object of this invention to provide a novel system for the control of an FCC process wherein a CO combustion catalyst is employed. Other objects of this invention will become apparent to those skilled in the art on reading this entire specification, including the claims thereof.

SUMMARY OF THE INVENTION

Figure 1:
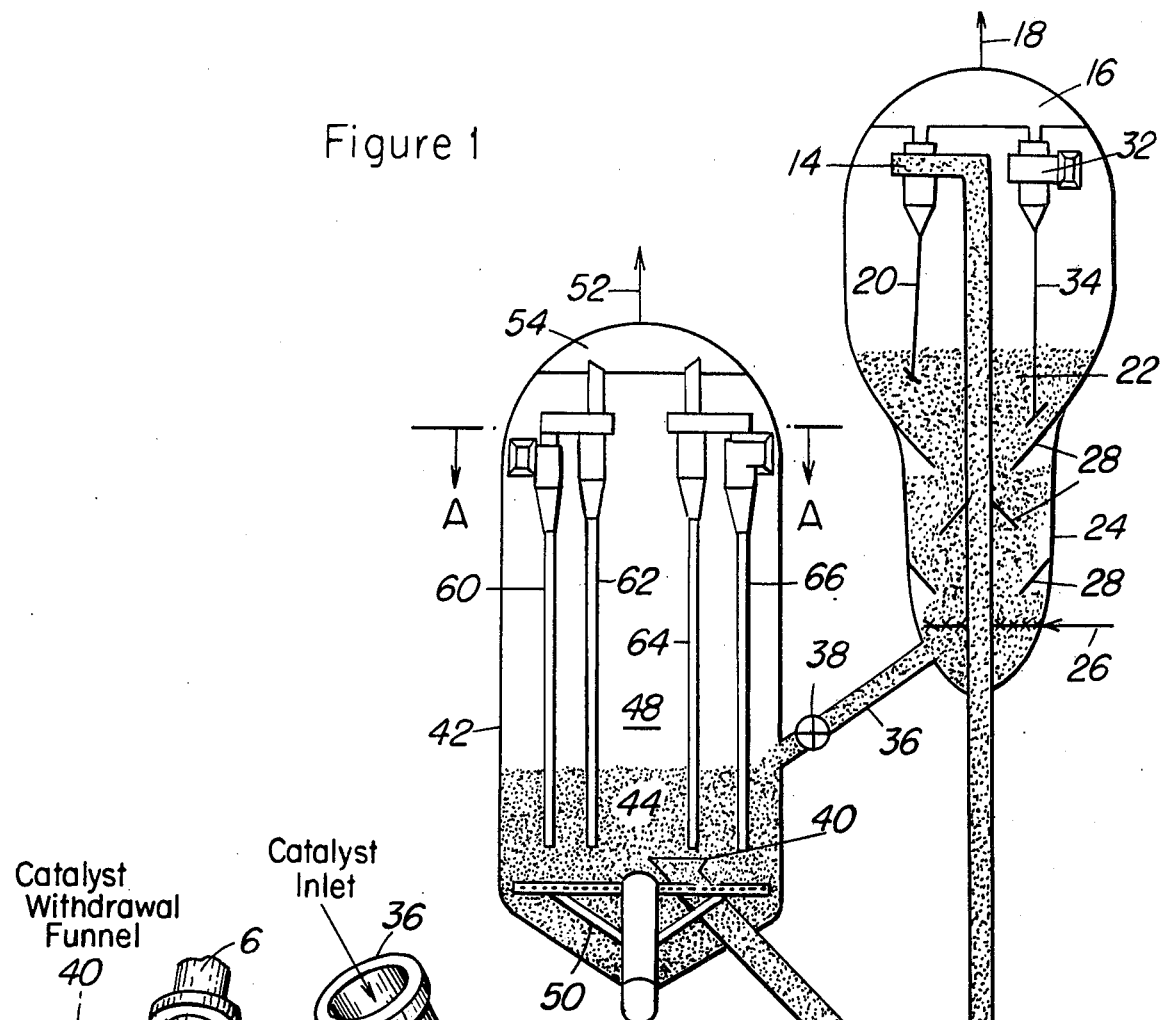
FIG. 1. Catalyst Section of an FCC Unit
FIG. 2. Section Through Regenerator
FIG. 3. A Control Scheme, FCC Unit
FIG. 4. FCC Unit with Riser Regenerator
FIG. 5. Typical Effect of a $CO_2/CO$ Ration on FCC Performance
FIG. 6. Relative Oxidation Activity
FIG. 7. Commercial Riser Sampling Survey Selectivity Plot Actual versus Model
FIG. 8. Operating Map for Commercial FCC Unit
FIG. 9. Operating Map for Commercial FCC Unit
FIG. 10. Operating Map for Commercial FCC Unit Different Chargestock
FIG. 11. Commercial Unit - Partial CO Burning Test
FIG. 12. Effluent CO Concentration from Regenerator
FIG. 13. Regenerator Behavior for Two Levels of Catalytic CO Burning Activity
FIG. 14. $CO_2/CO$ Ratio versus Temperature for Well Mixed Dense Bed
FIG. 15. Effect of Temperature on $CO_2/CO$ Ratio
FIG. 16. Effect of Addition of CO Promoter on Regenerator Temperatures Predicted with Regenerator Model
FIG. 17. Control Scheme

A kinetic predictive model of an FCC process, with limited constraint or with no contraint on the $CO_2/CO$ ratio, is employed to generate optimal operating conditions for a particular feedstock in said process. A computation is made for the control of catalyst inventory in said process so as to provide oxidation activity at the level required to produce the required $CO_2/CO$ ratio, and the process is operated at or near optimum conditions in accordance with the computed values.

This invention contemplates the use of a correlative model in place of a kinetic predictive model, although this is believed to be less desirable than a kinetic predictive model.

This invention also provides a method for control of an FCC process which utilizes a CO oxidation catalyst, wherein data on feedstock and catalyst activity are fed to an executive optimizer which in turn provides signal means to control means whereby the process is optimally operated.

DETAILED DESCRIPTION OF THE INVENTION

The improved process and method of control of this invention applies particularly to FCC, i.e. fluid catalytic cracking. It relies on the use of a model of the cracking process including regeneration of catalyst contaminated by coke. In the improved process and method, it is preferred to use a kinetic predictive model such as that described in copending patent applications Ser. No. 529,055 filed Dec. 3, 1974 and Ser. No. 472,525 filed May 23, 1974, the entire contents of which are incorporated herein by reference. The model is used, as illustrated hereinafter, with no constraint of the $CO_2/CO$ ratio, i.e. the $CO_2/CO$ ratio is allowed to vary from about 1.5, which usually obtains in the absence of the CO combustion promoter, to about 100, corresponding to substantially complete combustion of CO. Alternatively, the value of the ratio may be subjected to limited conttstraint, i.e. restricted to within the range of from about 1.5 to about 10, as when it is desirable to operate a CO boiler, for example. Either of these constraint conditions represent a novel departure in the use of the model since, ordinarily, wide variation of the $CO_2/CO$ ratio would not be contemplated.

It is a feature of the process and method of control of this invention that it is readily adaptable to change of feedstock, change in optimal product slate, or both. The type of operation may rapidly be changed from conventional, where the normal unpromoted CO combustion occurs with $CO_2/CO$ ratios of about 1.5, to a partial CO burning mode where improved regenerator performance is observed as the $CO_2/CO$ ratio increases to a range of 1.5–100, preferably in a region of 1.5–10, to complete CO burning where the CO in the effluent is completely combusted so that the effluent concentration is below 0.2%. As will become evident hereinbelow, there is usually a preferred method of operation that depends on the charge stock being used, the catalyst activity in the unit, certain metallurgical constraints, as well as the specific characteristics of the particular FCC unit that this invention is practiced on. It may sometimes be desirable to practice only limited or partial CO combustion over full or complete CO combustion due to temperature constraints imposed both by catalyst deactivation problems as well as metallurgical limits; due to loss in gasoline and conversion level in going from partial CO conversion to full CO conversion when the decrease in catalyst circulation is not compensated by lower carbon on regenerated catalyst; due to increased control response over complete CO burning units where changes in air rate do not cause corresponding changes in regenerator temperature; to maintain some steam generation in existing CO boilers; to implement independent temperature control of the regenerator by varying air rate, so that increased air rate results in higher $CO_2/CO$ ratios and higher regenerator temperatures. This is in marked contrast to conventional regeneration where increasing the air rate does not increase CO burning in the dense phase, but rather moves excess air into the cyclones and plenums, resulting in severe afterburning. Also it is distinct from complete CO burning where, with excess oxygen of 0.5–2% in the plenums, minor changes in the air rate do not serve to change the $CO_2/CO$ ratio, the carbon on regenerated catalyst level, or the regenerator temperature.

These modes are distinct and smooth transition within them and from one mode to another results from the proper use of the CO promoter in combination with certain process variable adjustments including but not limited to, control of air rate, and may include control of recycle of regenerated catalyst from the dilute phase back to the dense phase.

For any given FCC unit, there is a preferred mode of operation and furhtermore there is an optimum operating point within that mode that will maximize some desired quantity which may be total cracked product, total gasoline yield, fuel oil yield, or some combination of these products as determined by the product value of each component of the product stream and by the metallurgical and other constraints on the unit.

The kinetic predictive model hereinabove described is used to calculate the conversion and product distribution for any charge stock or combination thereof cracked over a cracking catalyst. This conversion and product distribution can be calculated for combinations of operating conditions such as, but not limited to, reactor top temperature, oil preheat temperature, fresh feed rate, combined feed ratio, ari preheat to the regenerator, carbon on regenerated catalyst level, air flow rate to the regenerator, excess oxygen level in the flue gas.

To accomplish this calculation we use the kinetic lumping framework detailed in Ser. No. 529,055. With this kinetic knowledge of charge stock behavior we can combine kinetic knowledge of carbon and CO burning in a typical FCC regenerator to calculate a heat balanced operating point for the integrated FCC unit. This calculation can easily be repeated for numerous combinations of process variables such as those just mentioned. Upon performing these calculations we will discover an optimum operating point that is unique for a particular charge stock over a catalyst of specific activity and subject to operating constraints of the FCC unit itself. These may include a temperature limit that cannot be exceeded, or a compressor size that places an upper limit on the air flow to the regenerator, or another compressor size that limits the amount of product gas that can be processed.

The optimum operating point that is determined will have certain process variables associated with it, such as carbon on regenerated catalyst level, $CO_2/CO$ ratio in the regenerator flue gas, regenerator dense bed temperature, feed preheat temperature, reactor top temperature etc. In general, the only way to achieve this optimum operating point is by independent control of $CO_2/CO$ ratio by utilizing a CO combustion catalyst in addition to all the other FCC operating variables. Operating the FCC with conventional catalysts does not give control of $CO_2/CO$ ratio. It gives either conventional performance or complete CO burning through thermal CO combustion in the regenerator dilute phase. Thus we will not be able to operate at our optimum without the additional control afforded by the CO oxidation catalyst. Futher we cannot discover that this optimum even exists without our calculation procedure, except through trial and error searching which is impractical if not impossible given the large amount of variable involved in a typical FCC unit. Typical computation is illustrated hereinbelow in this specification.

Referring now to concentrations of metal needed to achieve the desired $CO_2/CO$ ratio in the effluent from the regenerator, calculated metal as low as 0.01 ppm may be effective, at least on a short term basis, though it may age to ineffectiveness is a relatively short time. There should be some metal applied as additive to at least a portion of the catalyst inventory. It will be detectable by an increase in dense bed temperature, but may not be susceptible of measurement by chemical analysis.

Since the metal will age and so decline in activity, there is no clearly definable maximum numerical concentration of the platinum or other metal. As make-up catalyst containing platinum or other metal additive in fresh state is introduced to inventory, a corresponding amount of used catalyst is usually withdrawn. As a practical matter, the amount of metal (active and inactive) in the overall system should be held below 50 ppm as determined by analysis. Optimal operation is generally achieved at platinum levels below 10 ppm and this range is preferred. Maintenance of platinum level in active condition is accomplished by adding to inventory an amount of catalyst needed to maintain desired equilibrium cracking activity while withdrawing an equivalent amount of used catalyst. Some or all of the make-up catalyst will contain the desired metal additive in appropriate amount to sustain desired activity for oxidation of CO without appreciable effect on coke and hydrogen make. Good results have been obtained by using catalyst containing 5 ppm platinum as part of the make-up catalyst.

The catalyst used in the process or method of control of this invention is a porous, acidic solid of high surface area, such as activated clays, cogels of silica-alumina, silica-thoria, silica-zironia, silica alumina-zirconia, silica-magnesia and the like, all as well known to the prior art; but modified by incorporation of at least one metal from periods 6 and 7 of Group VIII or rhenium in an amount to induce the desired extent of oxidation of CO but insufficient to cause dehydrogenation of aliphatic compounds at catalytic cracking conditions of temperature in excess of 800° F. and pressure not higher than 50 pounds per square inch, gauge to such a degree that the hydrogen and coke make becomes excessive. The processes according to the invention are conducted without added hydrogen and yet the catalyst remains active and effective. Preferably the catalyst incorporates an active crystalline aluminosilicate zeolite with a pore size greater than 6 Angstrom Units, such as rare earth exchanged synthetic faujasite.

The metal CO oxidation components or compounds thereof are of particular benefit in catalysts containing silica, alumina, magnesia, zirconia, clay and combinations thereof. They are found to be of particular benefit in a composite catalyst of active crystalline aluminosilicate zeolites in a porous matrix, such as a clay-derived matrix. Other types of matrices include silica, alumina, magnesia, zirconia, and mixtures of these. Catalysts of this type are known in the art and are disclosed in U.S. Pat. Nos. 3,140,249, 3,140,251, 3,140,252, 3,140,253, etc.

The metal component may be incorporated into the catalyst by impregnation, by ion exchange or by other means by contacting either the catalyst or a component thereof with a solution of a compound of the metal in an appropriate amount necessary to provide the desired concentration within the scope of the invention. The metal component may be incorporated either in any step during preparation of the catalyst or after the finished catalyst has been prepared. A preferred manner of incorporation is to ion-exchange a crystalline aluminosilicate and then compositing the ion-exchanged product with a porous matrix. Also useful is the ion-exchanging or impregnation of siliceous solids or clays. Suitable metal compounds include the metal halides, preferably chlorides, ntirates, ammine halides, oxides, sulfates, phosphates and other water-soluble inorganic, salts; and also the metal carboxylates of from 1 to 5 carbon atoms, alcoholates. Specific examples include palladium chloride, chloroplatinic acid, ruthenium penta-ammine chloride, osmium chloride perrhenic acid, dioxobis (ethylenediamine) rhenium (V) chloride, rhodium chloride and the like. Alternatively, an oil-soluble or oil-dispersable compound of the metal may be added in suitable amount of a hydrocarbon feedstock, such as a gas oil charge stock, for incorporation in the catalyst as the charge is cracked. Such compounds include metal diketonates, carbonyls, metallocenes, olefin complexes of 2 to 20 carbons, acetylene complexes, alkyl or aryl phosphine complexes and carboxylates of 1 to 20 carbons. Specific examples of these are platinum acetylacetonate, tris (acetylacetonato) rhodium (III), triiocdoiridium (III) tricarbonyl, $\pi$-cyclopentadienylrhenium (I) tricarbonyl, rutherocene, $\pi$-cyclopentadienylosmium (I) dicarbonyl dimer, dichloro (ethylene) palladium (II) dimer, ($\pi$-cyclopentadienyl) (ethylene) rhodium (I), diphenylacetylenebis (triphenylphosphino) platinum (0), bromomethylbis (triethylphosphino) palladium (II), tetrakis (triphenylphosphino) palladium (0), chlorocarbonylbis (triphenylphosphino) irridium (I), palladium acetate, and palladium naphthenate.

The feedstocks which may be cracked using the catalysts of this invention include any conventional hydrocarbon stocks, such as naphthas, gas oil, light and heavy distillates, residual oils and the like.

Although the novel process and method of control of this invention has been described with great particularity with respect to fluidized type reactors, it is to be understood that it is also applicable to units which use small size catalyst particles, such as 10 to 200 microns particle diameter, and have the cracking conducted parimarily in the riser or transfer line. Similarly, the invention may be applied to more advanced regenerator designs in which at least part of the regeneration takes place in a riser, as contrasted to a backmixed dense bed. In fact, the additional heat generated by the catalyzed oxidation of CO can substantially improve riser regeneration performance. It is to be further understood that this invention is not limited to FCC units and fluid size, i.e., 10 to 200 microns particles diameter, catalyst particles. It also may be applied to moving bed-type reactors, such as TCC units, which use 4-8 Tyler mesh size catalyst particles.

When catalysts containing suitable low concentrations, usually well under 10 ppm total, of one or more metals chosen from PT, Pd, Rh, Ru, Ir, Os and Re are used in FCC units, many advantages become apparent in the operations of these units. The $\Delta T$ decreases; that is, the dense bed temperature increases and there is a sharp decrease in the dilute phase, cyclone and effluent gas temperature. More process heat is thereby retained by the dense bed for use in the reactor. With the increased dense bed temperature, a lower rate of catalyst circulation is required to supply the same amount of heat to the reactor. The reduced catalyst circulation results in less attrition and lower particulate emissions with the effluent regeneration gas, and may also reduce catalyst makeup requirements to maintain a given activity. With the higher dense bed temperature, the residual carbon on the catalyst returning to the reactor is reduced. It has been established that lower residual carbon will result in a higher effective catalyst activity. The lower catalyst circulation rate and the lower residual coke will improve selectivity, particularly by lowering yield of coke based on charge and a corresponding increase in valuable liquid products. With the catalyst of this invention steam injection to lower high cyclone temperatures is unnecessary. Injection of torch oil to raise the temperature of the dense bed to sustain thermal conversion of CO is also unnecessary. Aside from the cost of the steam and torch oil, both of these adjuvants accelerate the deactivation of the catalyst and make the process more difficult to control. A further advantage to decreased catalyst circulation rate is less erosion of the internals of the system. Although preheat of the feed to the cracking unit can also effect or allow a reduction in catalyst circulation rate, the efficiency of energy transfer in the form of heat to the reactor is greater when the heat is generated directly in the bed of catalyst.

In some fluid cracking units as well as in moving bed units, insufficient coke is deposited on the catalyst during the cracking cycle to generate enough heat when the coke is burned iun the regenerator. In such cases, the temperature in the regenerator is too low to effectively reduce the residual carbon to a desirable level (e.g., below 0.2% C.). Furthermore, new, higher selectively cracking catalysts, which produce more high-valued liquid products at the expense of coke cannot be used in these units, since they would be even more difficult to regenerate. With the catalyst of this invention sufficient additional heat is generated by oxidation of carbon monoxide to take advantage of any such improved selectivities.

In an actual commercial test in an existing FCC unit, which was not designed to completely combust all the carbon monoxide and which will be more fully described in the examples which follow, employing a catalyst such as would be used in this invention permitted the unit to be operated such that there was an actual increase in the amount of gasoline which was produced. This result is extraordinary since all the prior art processes which involved the addition of an oxidation promoter required a penalty to be paid with respect to gasoline make. The result illustrates the flexibility to permit controlled combustion of carbon monoxide in existing units so that it can permit improvement in the amount of valuable liquid products obtained. It is to be understood, of course, that even in those situations where the novel process of this invention is carried out so as to completely combust carbon monoxide, the penalty with respect to liquid products is substantially reduced.

It is to be noted that the present improved process and method of control is adapted to improvement of operation in existing catalytic cracking equipment representing many billions of dollars in capital investment, and attention is again directed to Fluid cracking equipment of the heat balanced type. It is typical of most Fluid regenerators that carbon is burned from the catalyst in a fluidized bed by air introduced at the bottom of the bed for the dual purpose of fluidizing the catalyst and of supplying oxygen for combustion of the coke deposit on the catalyst. Regenerator gas rising from above the bed carries with it some entrained catalyst. If the space above the bed is of about the same diameter as the bed, the concentration of catalyst therein, and hence density of the catalyst dispersion, is much lower than in the fluidized bed. If the gas rising from the bed is confined, it will have greater velocity and greater bulk density than in the case just discussed, but usually will be of less bulk density than the fluidized bed. For convenience, the art has come to refer to these two zones in the regenerator as "dense bed" in the fluidized portion and "dilute phase" thereabove. Those terms are so used here.

Burning of coke in the dense bed is primarily a matter of kinetics in the absence of a CO oxidation promoter, yielding both CO and $CO_2$. To the extent that oxygen is present in the gas of the dilute phase, it will react with CO to yield $CO_2$, with generation of heat. The heat so released can be absorbed only by the gas present and by the catalyst dispersed therein. At low bulk density in the dilute phase, combustion of CO serves primarily to heat the gas of the dilute phase, possibly to temperatures in excess of those which can be tolerated by metals of the cyclones, plenum chamber, flues and other equipment at the top of the regenerator. This constraint on permissible flue gas temperature in a specific FCC unit may be satisfied by supplying less than the amount of air required for complete combustion of carbon to $CO_2$ or by injecting a quench medium to the top of the regenerator. Of the feasible quench media, steam is expensive and water risks thermal shock cracking of metal parts.

Since the degree of carbon combustion in the dense bed is a function of temperature, it is desirable to operate at the highest practicable dense bed temperature in order to return regenerated catalyst to the reactor at minimum values of coke on regenerated catalyst and hence, maximum cracking activity. However, the above-described constraints on flue gas and other temperatures in the regenerator leads to a compromise at lower dense bed temperatures and therefore, lower catalyst effectiveness.

The present invention affords to the refiner an optimal compromise involving an adjustment of the degree to which CO is burned in the dense bed, thus decreasing the temperature differential ($\Delta T$) between dense bed and dilute phase. This permits operation of the dense bed at a higher temperature without exceeding the metallurgical constraint on internals at the top of the regenerator. It is surprising that this is so, because the comparison against prior practices is a comparison against a system in which the catalyst contained potent catalyst for combustion of CO. Reference is made to the nickel and vanadium deposited on cracking catalyst from the gas oil feed stocks contaminated by those catalytic metals. It is normal practice to withdraw some catalyst from the Unit and replace it with fresh catalyst to hold the nickel and vanadium concentration to a level, e.g. a few hundred parts per million, which will affect cracking selectivity only to an extent which can be tolerated. According to this invention, a very small amount of platinum group metal or rhenium causes a significant and controllable increase in regenerator dense bed temperature coupled with a reduction in regenerator $\Delta T$ without substantial adverse effect on the conversion level or gasoline selectivity in the reactor. It is even possible to increase conversion level and gasoline during cracking using a cracking catalyst promoted by a minute quantity of platinum according to the invention. Unexpectedly, these values can go through a maximum as dense bed temperature is increased, due to operating characteristics and inherent constraints of a particular unit. While the general shapes of the graphical representation of these data (hereinafter described) are remarkably consistent, the specific maxima can vary greatly from one unit to another.

Figure 2:
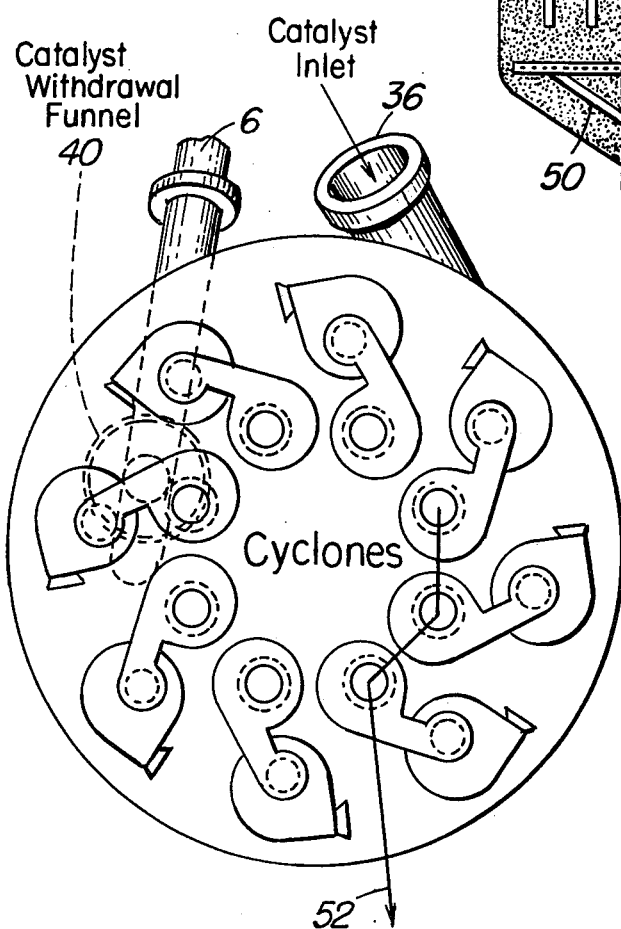
Figure 3:
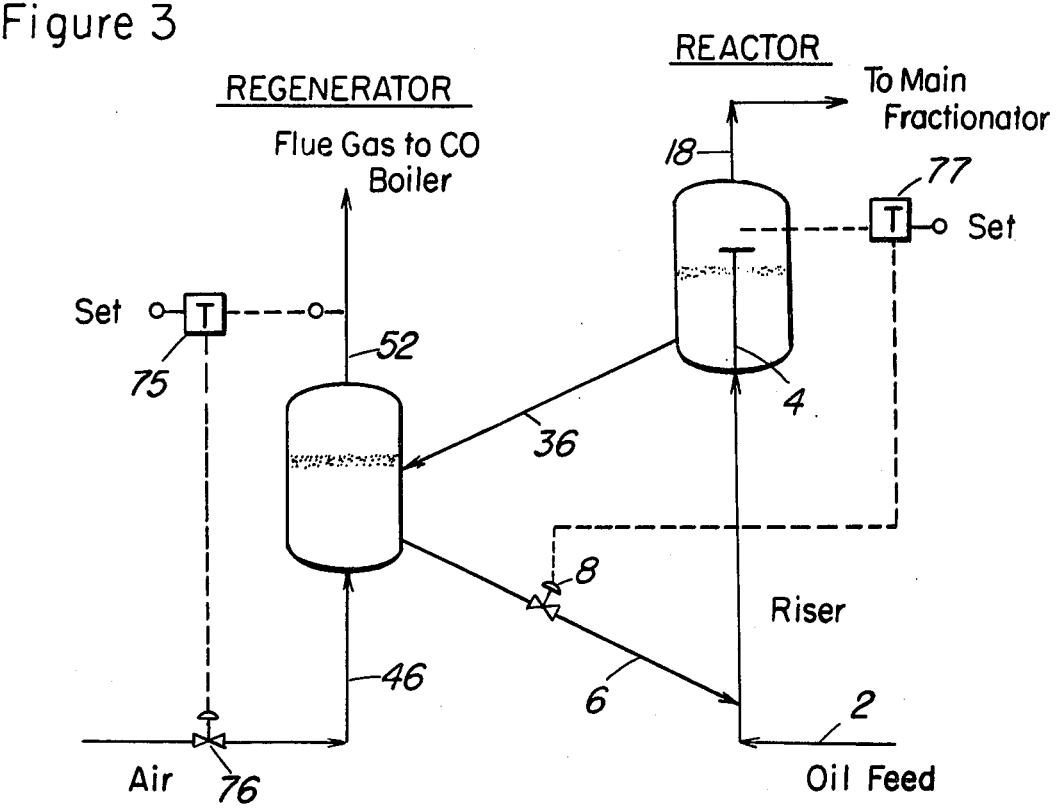

The unusual properties of these special catalysts are not restricted to operations at total CO conversion, as will be seen by review of operations in a commercial scale FCC Unit operating at a charge rate in excess of 40,000 barrels of fresh feed per day. The results will be set out with respect to a Unit having a "Swirl-type" regenerator, a typical form of which is shown in FIGS. 1 and 2 and for which the control scheme of two main control loops is shown in FIG. 3. It will be readily apparent that the results are also attainable in other types of regenerators such as that illustrated diagramatically in FIG. 4.

Referring now to FIG. 1, a hydrocarbon feed 2 such as a gas oil boiling from about 600° F. up to 1000° F. is passed after preheating thereof to the bottom portion of riser 4 for admixture with hot regenerated catalyst introduced by standpipe 6 provided with flow control valve 8. A suspension of catalyst in hydrocarbon vapors at a temperature of at least about 950° F. but more usually at least 1000° F. is thus formed in the lower portion of riser 4 for flow upwardly therethrough under hydrocarbon conversion conditions. The suspension initially formed in the riser may be retained during flow through the riser for a hydrocarbon residence time in the range of 1 to 10 seconds.

The hydrocarbon vapor-catalyst suspension formed in the riser reactor is passed upwardly through riser 4 under hydrocarbon conversion conditions of at least 900° F. and more usually at least 1000° F. before discharge into one or more cyclonic separation zones about the riser discharge, represented by cyclone separator 14. There may be a plurality of such cyclone separator combinations comprising first and second cyclonic separation means attached to or spaced apart from the riser discharge for separating catalyst particles from hydrocarbon vapors. Separated hydrocarbon vapors are passed from separator 14 to a plenum chamber 16 for withdrawal therefrom by conduit 18. These hydrocarbon vapors together with gasiform material separated by stripping gas as defined below are passed by conduit 18 to fractionation equipment not shown. Catalyst separated from hydrocarbon vapors in the cyclonic separations means is passed by diplegs represented by dipleg 20 to a dense fluid bed of separated catalyst 22 retained about an upper portion of riser conversion zone 4. Catalyst bed 22 is maintained as a downwardly moving fluid bed of catalyst counter-current to rising gasiform material. The catalyst passes downwardly through a stripping zone 24 immediately therebelow and counter-current to rising stripping gas introduced to a lower portion thereof by conduit 26. Baffles 28 are provided in the stripping zone to improve the stripping operation.

The catalyst is maintained in stripping zone 24 for a period of time sufficient to effect a higher temperature desorption of feed deposited compounds which are then carried overhead by the stripping gas. The stripping gas with desorbed hydrocarbons pass through one or more cyclonic separating means 32 wherein entrained catalyst fines are separated and returned to the catalyst bed 22 by dipleg 34. The hydrocarbon conversion zone comprising riser 4 may terminate in an upper enlarged portion of the catalyst collecting vessel with the commonly known bird cage discharge device or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separation step. In any of these arrangements, gasiform materials comprising stripping gas hydrocarbon vapors and desorbed sulfur compounds are passed from the cyclonic separation means represented by separator 32 to a plenum chamber 16 for removal with hydrocarbon products of the cracking operation by conduit 18. Gasiform material comprising hydrocarbon vapors is passed by conduit 18 to a product fractionation step not shown. Hot stripped catalyst at an elevated temperature is withdrawn from a lower portion of the stripping zone by conduit 36 for transfer to a fluid bed of catalyst being regenerated in a catalyst regeneration zone. Flow control valve 38 is provided in transfer conduit 36.

This type of catalyst regeneration operation is referred to as a swirl type of catalyst regeneration due to the fact that the catalyst bed tends to rotate or circumferentially circulate about the vessel's vertical axis and this motion is promoted by the tangential spent catalyst inlet to the circulating catalyst bed. Thus, the tangentially introduced catalyst at an elevated temperature is further mixed with hot regenerated catalyst or catalyst undergoing regeneration at an elevated temperature and is caused to move in a circular or swirl pattern about the regenerator's vertical axis as it also moves generally downward to a catalyst withdrawal funnel 40 (sometimes called the "bathtub") adjacent the regeneration gas distributor grid. In this catalyst regeneration environment, it has been found that the regeneration gases comprising flue gas products of carbonaceous material combustion tend to move generally vertically upwardly through the generally horizontally moving circulating catalyst to cyclone separators positioned above the bed of catalyst in any given vertical segment. As shown by FIG. 2, the catalyst tangentially introduced to the regenerator by conduit 36 causes the catalyst to circulate in a clock-wise direction in this specific embodiment. As the bed of catalyst continues its circular motion some catalyst particles move from an upper portion of the mass of catalyst particles suspended in regeneration gas downwardly therethrough to a catalyst withdrawal funnel 40 in a segment of the vessel adjacent to the catalyst inlet segment. In the regeneration zone 42 housing a mass of the circulating suspended catalyst particles 44 in upflowing oxygen containing regeneration as introduced to the lower portion thereof by conduit distributor means 46, the density of the mass of suspended catalyst particles may be varied by the volume of regeneration gas used in any given segment or segments of the distributor grid. Generally speaking, the circulating suspended mass of catalyst particles 44 undergoing regeneration with oxygen containing gas to remove carbonaceous deposits by burning will be retained as a suspended mass of swirling catalyst particles varying in density in the direction of catalyst flow and a much less dense phase of suspended catalyst particles 48 will exist thereabove to an upper portion of the regeneration zone. Under carefully selected relatively low regeneration gas velocity conditions, a rather distinct line of demarcation may be made to exist between a dense fluid bed of suspended catalyst particles and a more dispersed suspended phase (dilute phase) of catalyst thereabove. However, as the regeneration gas velocity conditions are increased there is less of a demarcation line and the suspended catalyst passes through regions of catalyst particle density generally less than about 30 lbs. per cu. ft. A lower catalyst bed density of at least 20 lb/cu. ft. is preferred.

A segmented regeneration gas distributor grid 50 positioned in the lower cross-sectional area of the regeneration vessel 42 is provided as shown in FIG. 1 and is adapted to control the flow of regeneration gas passed to any given vertical segment of the catalyst bed thereabove. In this arrangement, it has been found that even with the generally horizontally circulating mass of catalyst, the flow of regeneration gas is generally vertically upwardly through the mass of catalyst particles so that regeneration gas introduced to the catalyst bed by any given grid segment or portion thereof may be controlled by grid openings made available and the air flow rate thereto. Thus, oxygen containing combustion gases after contact with catalyst in the regeneration zone are separated from entrained catalyst particles by the cyclonic means provided and vertically spaced thereabove. The cyclone combinations diagrammatically represented in FIG. 1 are intended to correspond to that represented in FIG. 2. Catalyst particles separated from the flue gases passing through the cyclones are turned to the mass of catalyst therebelow by the plurality of provided catalyst diplegs.

As mentioned above, regenerated catalyst withdrawn by funnel 40 is conveyed by standpipe 6 to the hydrocarbon conversion riser 4.

The regenerator system shown in FIGS. 1 and 2 is designed for delivery of regenerator flue to a CO boiler (not shown) where the CO is burned with excess air to release heat to tubes for generation of stream. Flue gas from the dilute phase passes through two stages of cyclone separators to a plenum chamber 54 to conduit 52. Catalyst particles removed in the cyclones are returned to the dense bed 44 by diplegs 60, 62, 64 and 66.

As illustrated in FIG. 3, primary operating parameters are set by control loops responsive to flue gas temperature and reactor top temperature. Top temperature in the regenerator is maintained at a constant level which will avoid exceeding metallurgical limits. Temperature of the flue gas is compared against a set point at temperature controller 75 which operates a valve 76 to adjust the air supply to the regenerator. The flue gas temperature, in the absence of quenching at the top of the regenerator represents increase over dense bed temperature by the factor $\Delta T$ resulting from burning of CO in the dilute phase. As temperature in the flue 52 tends to rise, air supply is reduced, temperature in the dense bed drops, and the level of coke on regenerated catalyst rises.

The flow of regenerated catalyst to the reactor is controlled to maintain a desired top temperature in the reactor. That top temperature is a function of sensible heat of catalyst and feed stock reduced by the endothermic heat of reaction and of vaporization of the hydrocarbon feed. A rise in reactor top temperature, sensed by a suitable thermocouple, is compared at temperature controller 77 against a set point, which operates slide valve 8 to increase flow of regenerated catalyst for additional heat spply if reactor temperature drops or decrease catalyst flow when reactor temperature tends to rise. These controls are the major factors in achieving the "heat-balances" principle of FCC operation. As will be seen, these automatic controls which are essential to the "rule of operation" of the unit, impose additional constraints on freedom of the operator to impose control on a single variable of the operation. For example, he can change the preheat of the charge, but only if he accepts reduction in catalyst circulation rate when reactor temperature rises.

Figure 4:
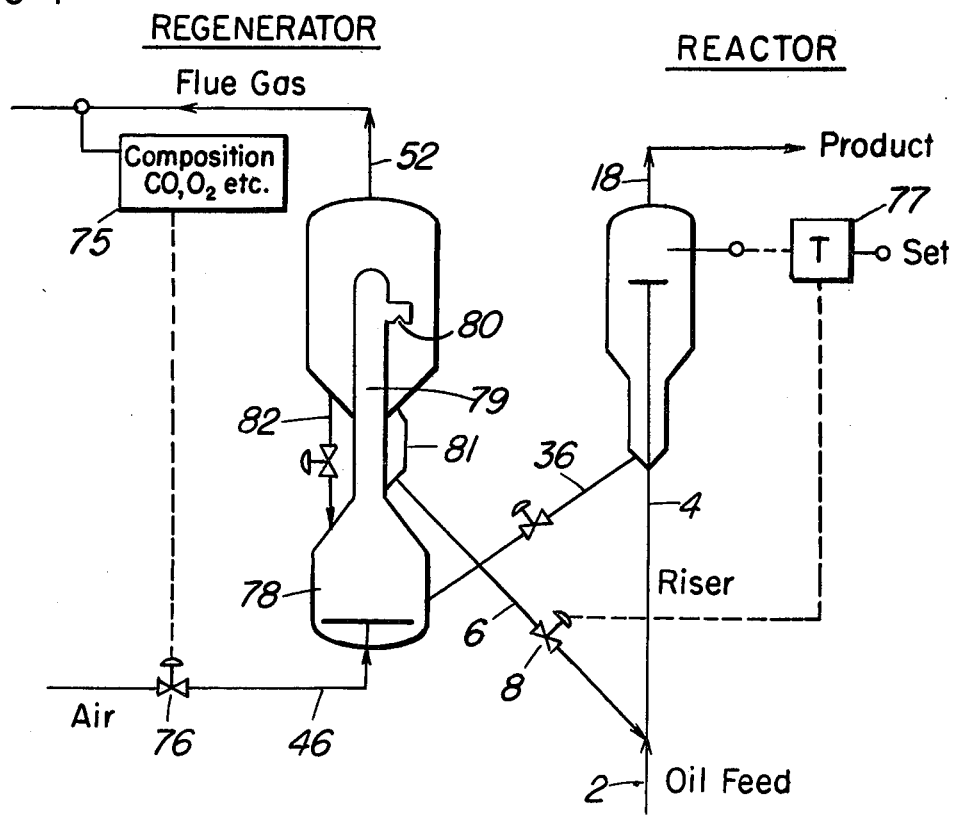

Similar constraints to achieve heat balance are characteristic of newer units designed for complete combustion of CO. One such design is illustrated in FIG. 4. The reactor and its control loop are similar to those of FIG. 3. The regenerator is characterized by a bottom chamber 78 in which a fluidized bed is maintained by air from line 46. A riser 79 carries regenerated catalyst upwardly from the dense bed under conditions conducive to oxidation of CO with consequent temperature rise to discharge at port 80. The flue gases pass through cyclones, not shown, to flue 52. A portion of the hot regenerated catalyst is stripped in stripper 81, to enter return line 6. Another portion of the hot catalyst is recycled to the dense bed in chamber 78 by line 82 for maintenance of dense bed temperature. Here the controller 75 which operates air valve 76 is responsive to analysis of flue gas for content of $O_2$, CO and the like. It will be immediately apparent that this system, like that of FIG. 3, imposes constraints on what the operator can do.

When promoted catalyst in accordance with this invention is added to a commercial unit, used in the real world, some striking effects are found. Bench scale tests indicate that platinum can be added to cracking catalyst in small amounts to promote CO oxidation with little or no impairment of cracking activity, measured as percent conversion of gas oil or selectivity to liquid products, e.g. gasoline. From this information, which itself renders these catalysts unique, it is to be assumed that commercial units would, at best, produce as much desired liquid product as the same catalyst without precious metal promoter. Surprisingly, proper adjustment of promoted catalyst concentration and other parameters results in increased yields of desired liquid product. Such increase can go through a maximum, followed by decreased yields as severity of regenerator conditions continues to rise. Having obtained this result, it is capable of explanation on analysis of all observed data in the light of the constraints applicable to commercial equipment. As oxidation of CO takes place in the dense bed, rather than the dilute phase, with flue gas exit temperature within metallurgical limits; dense bed temperature increases with consequent decrease in carbon on regenerated catalyst. The catalyst of decreased carbon content has enhanced selectivity for yielding desired liquid products such as gasoline. It is also at a higher temperature than catalyst regenerated in the absence of the present promoter. Hence, as the dense bed temperature increases, the constraint imposed by the control loop responsive to reactor temperature acts to restrict flow through the slide valve 8 and the ratio of catalyst to oil feed drops, tending to reduction in conversion level in the reactor.

By balancing these two effects, namely reduced carbon on regenerated catalyst and increased regenerated catalyst temperature, the operator can achieve an important increase in liquid product yield by addition of the present promoter, even though the CO content side of the flue gas is so high as to require a CO boiler or other supplementary CO combustion in order to satisfy emission standards.

The following examples illustrate certain aspects of the process of this invention, and are not to be construed as limiting thereon.

EXAMPLE 1

215 cc of an aqueous Pd $(NO_3)_2$ solution containing 0.0103 g. Pd/liter were added to 222 g, bone dry basis, of a calcined RENaY containing 16.1 wt. % $RE_2O_3$ and 2.7 wt. % Na to 0.001 wt.% (10 ppm) Pd. The zeolite was calcined at 1200° F. for 1 hour. The zeolite (10 wt.%) was incorporated in a matrix (90 wt.%) consisting of 40 wt.% Georgia kaolin, 57.4 wt.% $SiO_2$, 0.6 wt% $Al_2O_3$, and 2 wt.% $ZrO_2$ to provide 1 ppm palladium in the composite catalyst. The matrix was prepared by mixing water, kaolin, Q-Brand sodium silicate (28.9 wt.% $SiO_2$, 8.9 wt.% $Na_2O$, and 62.2 wt% $H_2O$), aluminum sulfate, sodium zirconium sulfate, and sulfuric acid. The mixture was spray dried and the catalyst was exchanged with an aqueous 5 wt.% $(NH_4)_2 SO_4$ solution, washed, and impregnated with an aqueous 7 wt.% $RECl_3.6H_2O$ solution. The catalyst was then dried in an oven at about 250° F. and a portion of it was steamed for 4 hours at 1400° F. and 0 psig, the heating to 1400° F. being carried out in a $N_2$ atmosphere.

EXAMPLE 2

215 cc of an aqueous $H_2PtCl_6$ solution containing 0.0103 g Pt/liter were added to another 222 g portion of the calcined RENaY of Example 1 to provide 10 ppm platinum. A catalyst was then prepared by the same procedure as in Example 1.

The cracking performance of the catalysts of Examples 1 and 2 were determined. A wide-cut Mid-Continent gas oil feedstock was cracked at 925° F. at a catalyst-to-oil ratio of 3 by wt. 8.3 WHSV, catalyst residence time 2.4 minutes; the results were:

| Catalyst (Example) | Ex. 1 | Ex. 2 | Blank* |
|---|---|---|---|
| Conversion, % vol. | 74.4 | 70.7 | 72.1 |
| $C_5+$ gasoline % vol. | 65.0 | 63.0 | 64.3 |
| Total $C_4$'s, % vol. | 14.4 | 12.6 | 13.3 |
| Dry Gas, % wt. | 6.4 | 5.6 | 5.6 |
| Coke, % wt. | 2.5 | 2.3 | 2.3 |
| Carbon on Cat., % wt. | 0.71 | 0.65 | 0.65 |
| Hydrogen Factor** | 39 | 27 | 30 |

*Catalyst without added metal component.
**100 × [moles $H_2$/moles $C_1 + C_2$]

The two catalysts were subjected to regeneration in two successive stages. The conditions of each stage of regeneration were as follows: Air was passed over the catalyst at a rate of 25 cc/min./gram of catalyst at 1000° F. and atmospheric pressure for 8 minutes, and the gas was collected.

The results were as follows:

| | Ex. 1 | Ex. 2 | Blank* |
|---|---|---|---|
| First Stage | | | |
| $CO_2$, mol % | 3.5 | 5.2 | 4.0 |
| CO, mol % | 2.7 | 0 | 3.2 |
| $CO_2/CO$ | 1.3 | α | 1.3 |
| Initial Carbon, % wt. | 0.71 | 0.65 | — |
| Final Carbon, % wt. | 0.42 | 0.43 | — |
| Second Stage | | | |
| $CO_2$, mol % | 2.0 | 2.7 | 2.4 |
| CO, mol % | 1.2 | 0 | 1.7 |
| $CO_2/CO$ | 1.7 | α | 1.4 |
| Initial Carbon, % wt. | 0.42 | 0.43 | — |
| Final Carbon, % wt. | 0.28 | 0.26 | — |

*Catalyst without metal component

EXAMPLE 3

An RENaY (222 g) was prepared in the same manner as in Example 1, except that it was uncalcined. Thereafter, 163 cc of an aqueous $H_2PtCl_6$ solution containing 0.0137 g Pt/liter were added to provide 0.001 wt.% (10 ppm) platinum. A composite catalyst containing 1 ppm platinum was then prepared by the same procedure as in Example 1.

Cracking data, using the same feedstock as in the previous examples and under the same conditions, and regeneration data under the same conditions as in the previous examples were as follows:

| Catalyst | Ex. 3 | | Blank | |
|---|---|---|---|---|
| Conversion, % vol. | 76.2 | | 74.4 | |
| Coke, % wt. | 3.0 | | 2.4 | |
| Carbon on Cat., % wt. | 0.84 | | 0.69 | |
| Hydrogen Factor | 29 | | 17 | |
| Regeneration | Stage 1 | Stage 1 | Stage 2 | Stage 2 |
| $CO_2$, mol % | 8.3 | 3.3 | 4.7 | 1.6 |
| CO, mol % | 0.6 | 3.0 | ≦0.1 | 1.4 |
| $CO_2/CO$ | 13 | 1.1 | ≧47 | 1.1 |
| Final C, % wt. | 0.56 | 0.56 | 0.44 | — |

The increased $CO_2/CO$ mole ratio with the presence of only 1 ppm of platinum clearly illustrates the advantage of the metal component in the catalysts of this invention.

EXAMPLE 4

A rare-earth exchanged zeolite Y (15.8 wt. % $RE_2O_3$, 2.7% Na) was slurried with an aqueous solution containing $[Pt(NH_3)_6]Cl_4$. The resulting platinum-containing zeolite was filtered, dried at 250° F., and calcined at 1200° F. for one hour. The resulting zeolite was incorporated in a matrix as described in Example 1 to give a finished cracking catalyst containing 10% of the zeolite by weight to which 1 ppm platinum had been added. A blank catalyst was prepared similarly, the $[Pt(NH_3)_6]Cl_4$ being eliminated from the zeolite slurry.

Both catalysts were heated to 1400° F. and steamed as in Example 1, used to crack the feedstock of Example 1 and regenerated under the conditions of Example 2. The results were as follows:

| | Ex. 4 | Blank |
|---|---|---|
| Conversion, % vol. | 76.1 | 73.9 |
| Coke, % wt. | 2.8 | 2.5 |
| Carbon on Cat., % wt. | 0.82 | 0.73 |
| Hydrogen Factor | 19 | 16 |
| Regeneration | Stage 1 | Stage 2 |
| $CO_2$, % mol | 5.9 | 3.3 |
| CO, % mol | 0.15 | 1.7 |
| $CO_2/CO$ | 39 | 1.9 |

EXAMPLE 5

A commercial cracking catalyst consisting of 15% REY and 85% matrix of 57.4% silica, 0.6% alumina, 40% clay and 2.0% zirconia, which had been spray dried, exchanged with ammonium nitrate and water-washed, was slurried with an aqueous solution of rare earth chloride and $Pt(NH_3)_4Cl_2$ sufficient to provide 3% $RE_2O_3$ and 2 ppm platinum to the finished catalyst. The catalyst was spray dried, heated in nitrogen, then steamed for 4 hours at 1400° F. A blank catalyst without platinum was prepared and treated similarly, Pt $(NH_3)_4Cl_2$ being omitted from the slurry.

Both catalysts were used to crack the same feedstock as in Example 2 and regenerated under the conditions of Example 2. The results were as follows:

| | Ex. 5 | Blank |
|---|---|---|
| Conversion, % vol. | 79.5 | 78.8 |
| Coke, % wt. | 3.3 | 3.1 |
| Carbon on Cat., % wt. | 0.945 | 0.884 |
| Hydrogen Factor | 15.8 | 12.1 |
| Regeneration | Stage 1 Stage 1 | Stage 2 |
| $CO_2$, mol % | 8.2  4.2 | 5.7 |
| CO, mol % | 1.2  3.4 | 0.25 |
| $CO_2/CO$ | 6.8  1.2 | 23 |

EXAMPLE 6

A number of metals of the platinum group and rhenium were used to treat a catalyst containing 15% REY silica-alumina-clay-zirconia matrix (similar to that of Example 5). Solutions of the metal salts of appropriate concentration were added to the catalyst until it was wet. The finished catalyst was dried at 250° F. for 24 hours, heated in nitrogen at 1400° F. over 3½ hours and steamed for 4 hours. The metal salts were the chlorides of iridium, osmium and rhodium, and [Ru(NH$_3$)$_5$Cl$_2$]Cl$_2$ rhenium di(ethylene diamine) dioxide chloride, Pt(NH$_3$)$_4$Cl$_2$ and Pd(NO$_3$)$_2$. A total amount of metal equal to 3 ppm was so supplied. After the cracking of a wide-cut Mid-Continent gas oil feed and regeneration studies as in Example 2, the following results were obtained.

| Regeneration | Blank | Pt | Ir | Os | Pd | Rh | Ru | Re | Pt + Re* |
|---|---|---|---|---|---|---|---|---|---|
| Stage 1 | | | | | | | | | |
| CO$_2$, % mol | 3.8 | 7.1 | 5.7 | 4.2 | 4.6 | 4.9 | 4.5 | 3.8 | 4.6 |
| CO, % mol | 3.7 | 0.15 | 0.3 | 2.8 | 1.15 | 1.2 | 2.8 | 3.5 | 3.1 |
| CO$_2$/CO | 1.0 | 47 | 19 | 1.5 | 4.0 | 4.0 | 1.6 | 1.1 | 1.5 |
| Stage 2 | | | | | | | | | |
| CO$_2$, % mol | — | — | — | 2.0 | — | 2.7 | 3.5 | 2.7 | — |
| CO, % mol | — | — | — | 1.65 | — | 0.7 | 1.0 | 1.4 | — |
| CO$_2$/CO | — | — | — | 1.2 | — | 3.9 | 3.5 | 1.9 | — |

*Made from H$_2$PtCl$_6$ and HReO$_4$ to provide 1.5 ppm of each metal.

EXAMPLE 7

In this example, equilibrium catalyst withdrawn from a commercial FCC unit was used. A wide-cut Mid-Continent gas oil stock was cracked at 929° F., 3 catalyst-oil ratio ratio, 2.4 minute catalyst residence time. The catalyst was regenerated in place in 2 stages under the conditions of Example II. Then, the same gas oil, but now containing platinum acetylacetonate dissolved therein in sufficient quantity to provide 1 ppm platinum on the catalyst, was introduced into the cracker at the same conditions, except slightly higher temperature. The catalyst was regenerated again. Then the platinum-containing feed was again cracked over the same catalyst, and again the catalyst was regenerated. The following results were obtained:

| Cracking Feed | Gas Oil | Gas Oil & Pt | Gas Oil & Pt |
|---|---|---|---|
| Cycle | 1 | 2 | 3 |
| Temperature, °F. | 929 | 936 | 926 |
| Conversion, % vol. | 56.5 | 57.3 | 50.4 |
| Coke, % Wt. | 2.3 | 2.4 | 2.3 |
| Carbon on Cat., % wt. | 0.67 | 0.67 | 0.67 |
| Hydrogen Factor | 25 | 29 | 31 |
| Regeneration | | Stage 1 | |
| CO$_2$, % mol | 3.2 | 5.1 | 5.6 |
| CO, % mol | 2.7 | 0.18 | 0.10 |
| CO$_2$/CO | 1.2 | 28 | 56 |
| Estimated Pt on Catalyst at end of Cycle, ppm | 0 | 1 | 2 |

EXAMPLE 8

A commercial amorphous silica-alumina fluid cracking catalyst consisting of 13% Al$_2$O$_3$, 87% SiO$_2$ was impregnated with an aqueous solution of Pt(NH$_3$)$_4$Cl$_2$, oven-dried at 250° F., then heated and steamed at 1400° F. as in Example 1. The amount of platinum compound supplied was equivalent to 3 ppm of the metal. The catalyst without metal addition (blank), similarly treated, and the platinum-containing catalyst were used in the fluid cracking of the Mid-Continent gas oil stock, and then regenerated under the conditions of Example 2. The results were as follows:

| Catalyst | Ex. 8 | Blank |
|---|---|---|
| Conversion, % vol. | 35.8 | 35.6 |
| Coke, % wt. | 1.82 | 1.54 |
| Carbon on Cat., % wt. | 0.52 | 0.44 |
| Regeneration | Stage 1 | |
| CO$_2$, % mol | 4.8 | 2.2 |
| CO, % mol | ≦0.05 | 1.2 |
| CO$_2$/CO | ≧96 | 1.8 |

EXAMPLE 9

Moving bed catalysts are also improved by the presence of the added metal component of this invention. (a) A blank catalyst was prepared by incorporating 7.5% of the calcined rare-earth exchanged zeolite Y of Example 4 and 40% alumina fines in a silica-alumina matrix (93.6% SiO$_2$, 6.4% Al$_2$O$_3$) by the bead technique described in U.S. Pat. No. 3,140,249.

After base-exchange and washing, the hydrogel beads were dried in pure steam of atmospheric pressure at 270° F. for 15 minutes, then at 340° F. for 15 minutes. The dried catalyst was finished by a 14-hour steam treatment at 1290° F. with 100% steam at atmospheric pressure. This blank catalyst was used in static bed cracking of a Mid-Continent gas oil at 875° F., a liquid hourly space velocity of 3 and a catalyst/oil ratio of 2 with 10 minutes on stream. The spent catalyst was regenerated and the CO$_2$/CO ratio determined. (b) Rare-earth exchanged zeolite Y filter cake, 1530.6 g, containing 49.0%=750 g of solids, was mulled with 160 cc of a H$_2$PtCl$_6$ solution containing 10.03 mg of Pt until uniform, then dried at 250° F. and calcined at 1200° F. for 3 hours. The product contained 13.4 ppm of platinum designed to provide 1 ppm of platinum to the catalyst after combination with the matrix. The preparation of the catalyst was completed as above. (c) The blank zeolite-matrix bead hydrogel was treated for 1 hour with sufficient Pt(NH$_3$)$_4$Cl$_2$ solution to supply 1 ppm of platinum based on the finished catalyst. (d) The calcined zeolite of paragraph (a) was used to prepare a catalyst similar to that described in (a) except that the matrix contained about 2200 ppm of cogelled Cr$_2$O$_3$.

These catalysts were also used in cracking the said feedstock at the same conditions, and were regenerated at the conditions of Example 2. The following results were obtained:

|  | (a) | (b) | (c) | (d) |
|---|---|---|---|---|
| Catalyst |  |  |  |  |
| Conversion, % vol. | 68.8 | 69.3 | 70.4 | 70.9 |
| Coke, % wt. | 2.9 | 3.2 | 3.1 | 3.2 |
| Regeneration |  |  |  |  |
| $CO_2$, % mol | 5.5 | 7.3 | 8.3 | 5.4 |
| CO, % mol | 4.8 | 0.4 | 0.2 | 5.0 |
| $CO_2/CO$ | 1.1 | 18 | 42 | 1.1 |

EXAMPLE 10

A commercial clay-derived alumino-silicate zeolite cracking catalyst, containing about 55% by weight of alumina and about 45% by weight of silica and having an average particle size of between 58 and 64 microns, was employed in this example. A 1000 gram sample was mixed with 3500 cc of a solution containing 58.4 grams of $RECl_3.6H_2O$ and 2.7 mg of Pt as platinum tris (ethylene diamine) tetrachloride. After stirring for 30 minutes at 75° C. the catalyst was filtered out, water-washed and dried at 250° F. The catalyst contained 3 ppm platinum and 3% by weight of rare earth oxide. Another sample of the same clay-derived catalyst ("Blank") was treated similarly, but without the platinum although with a slightly higher rare earth concentration present in the solution. The final catalyst contained 4.2% by weight of rare earth oxide. Both catalysts were steamed and tested for cracking performance as in Example 2.

A portion of each coked catalyst from the test was blended with uncoked steamed catalyst so that the carbon level of the mixture was 0.65% by weight. Regeneration was conducted at 1340° F. and atmospheric pressuring using 1.38 moles of oxygen per mole of carbon and the gas was collected. The following data were obtained:

| Regeneration | Ex. 10 | Blank |
|---|---|---|
| $CO_2$, % mol | 9.1 | 7.6 |
| CO, % mol | 0.3 | 3.6 |
| $CO_2/CO$ | 30 | 2.1 |

EXAMPLE 11

The catalyst of Example 4, containing 1 ppm of platinum was calcined at 1200° F. on $N_2$ for 3 hours. A wide-cut Mid-Continent gas oil feedstock was cracked over this catalyst at 910° F. at a catalyst to oil ratio of 2.0 by weight, 12.5 WHSV and catalyst residence time of 2.4 minutes.

The coked catalyst from this run was blended in various concentrations with an equilibrium commercial zeolite catalyst withdrawn from a commercial FCC unit. This catalyst which contained no platinum had been regenerated and then used to crack the same gas oil feedstock as in Example 1 under the same conditions.

The variously blended coked catalysts were regenerated under the same conditions as in Example 2. The results were as follows:

| Pt-Containing Catalyst in Blend, % by wt. | Estimated Pt in Blend, ppm | $CO_2$ % mol | CO % mol | $CO_2/CO$ |
|---|---|---|---|---|
| 0 | 0 | 5.7 | 5.0 | 1.1 |
| 1 | 0.01 | 4.6 | 2.4 | 1.8 |
| 2 | 0.02 | 4.8 | 2.4 | 1.9 |
| 4 | 0.04 | 4.4 | 2.3 | 1.9 |
| 20 | 0.20 | 6.7 | 0.6 | 11 |
| 50 | 0.50 | 6.1 | 0.68 | 9.0 |
| 100 | 1.0 | 8.1 | 1.3 | 6.2 |

This experiment indicates that even at concentrations as low as 0.01 ppm of added metal component, the $CO_2/CO$ ratio is increased during regeneration.

The catalyst with added metal component may even contain an amount of metal component greater than that of the ultimate cracking catalyst mixture, such as, for example, but not necessarily, 100 ppm, provided that either in the use of the catalyst for cracking or in the regeneration of used catalyst it is blended with cracking catalyst containing less or no metal component at sufficient concentrations to reduce the total added metal component to a concentration below 100 ppm.

It may thus be seen from the results of the cracking operations and subsequent regeneration data that the catalysts of this invention are just as effective in hydrocarbon conversion as conventional cracking catalysts. However, in the regeneration step, the $CO_2/CO$ effluent ratios are extraordinarily higher than catalysts without the added metal component. The type of catalyst, feedstock or manner of introducing the new component does not destroy the effectiveness in regeneration efficiency.

EXAMPLE 12

This example demonstrates that Pt is an effective CO oxidative agent when it is incorporated in a hydrous composite of all the gel components prior to spray drying.

A cracking catalyst incorporating 5 ppm of Pt with 15% rare earth zeolite Y in a silica-alumina clay matrix (60% $SiO_2$-15% $Al_2O_3$-25% clay) was prepared as follows:

581.4 grams of WP grade Georgia kaolin were added to 45.2 lb (5.4 gallons) of deionized water and the whole was mixed thoroughly. 4167 grams Q-brand sodium silicate (1200 gms $SiO_2$) were added slowly to the water-clay slurry, such that the clay was uniformly dispersed and coated with the sodium silicate. The mixture was heated to 120° F. and 216.1 ml concentrated (96.9%) sulfuric acid was added at a uniform rate over a period of 25 min. while mixing. The whole mixture was then held at 120° F. for one hour while mixing, then allowed to cool to ambient temperature. A solution of 1744.2 grams aluminum sulfate (500 gms $Al_2O_3$) dissolved in 6977 ml deionized water was added slowly to the mixture while stirring. The resulting mixture, which had a pH of 3.3, was treated with 1150 ml of conc. ammonium hydroxide (29.8% $NH_3$) while stirring, in order to precipitate the alumina on the silica gel. The mixture was then acidified with 93 ml concentrated sulfuric acid (95.9%) to a pH of 4.6.

294.2 gms of REY (68% of the sodium content had been replaced with rare earth cations), which had previously been calcined at about 1200° F. for about 10 min., were dispersed in 883 ml deionized water in a Waring blender (the REY had the following composition: $SiO_2$ = 57.9%; $Al_2O_3$ = 19.0% $RE_2O_3$ = 15.4%; Na- $_2O = 3.6\%$). The zeolite slurry was added to the silica-alumina-clay mixture while mixing. The zeolite-matrix slurry was filtered on a Buchner funnel and the filter cake reslurried with deionized water to a total weight of 55 lbs, 230 gms ammonium sulfate added, and the whole mixture stirred for 30 minutes. The composite hydrogel was then washed by filtering, reslurrying the filter cake with deionized water to a total weight of 80 lbs and refiltering. This washing procedure was performed three times. After the final filtration, the filter cake was reslurried to a total weight of 51 lbs with deionized water; the pH of the final slurry was 4.5.

To the final slurry of the catalyst composite 5.7 mil of a solution containing 2 mg Pt/ml as Pt $(NH_3)_4Cl_2$ was added (a total of 11.4 mg Pt). The mixture was homogenized and spray dried (inlet gas to spray drier about 700° F. and outlet gas about 350° F.) to produce microspheres of from about 1 to 140 microns in diameter, with an average partical size of 79 microns. A sample of the product analyzed as follows: $Na = 0.39\%$, $RE_2O_3 = 1.82\%$; $Al_2O_3 = 25.0\%$.

The catalyst was steam treated and tested for cracking activity and selectivity as previously described. The oxidation activity was determined by passing air (215°/min) through a fluidized bed of 10 gms of a blend of coked and uncoked steamed catalyst containing a total of 0.65% carbon at 1340° F. Analyses of the effluent gas for CO and $CO_2$ gave a $CO_2/CO$ ratio of 2.9, substantially higher than would be anticipated for the same catalyst without platinum.

EXAMPLES 13-18

Platinum was incorporated in fresh samples of commercial catalysts produced by the Filtrol Corporation. Filtrol 75-F, HS-7 and HS-10 were impregnated with aqueous solutions containing sufficient [Pt(NH$_3$)$_4$] Cl$_2$ to give 5 ppm Pt in the finished catalyst. The amount of solution used was just sufficient to fill the pores of the catalyst, so that Pt retention was quantitative. In an additional preparation, the impregnating solution contained both [Pt(NH$_3$)$_4$]Cl$_2$ and rare earth chloride hexahydrate sufficient to produce 5 ppm Pt and 3.0% RE$_2$O$_3$ in the finished catalyst. All the preparations were dried in air at 250° F., then mildly steam treated for 4 hours—1400° F.—0 psig in 100% steam in a fluidized bed.

Cracking activity and selectivity were tested by cracking a wide-cut Mid-Continent gas oil over the steamed catalysts at 920° F., 3 C/O, 8.3 WHSV in a fixed fluidized bed. The results of these tests showed that the presence of Pt produced no significant effect on activity or selectivity; in particular, Pt had a negligible effect on hydrogen factor (see attached tables).

Oxidation activity was tested by blending the coked catalysts from the cracking test to 0.65% carbon with uncoked steamed catalysts, then passing a stream of air (215 cc/min) through a fluidized bed of 2 gms of the blended coked catalyst at 1190° F. The effluent gas was analyzed for CO and $CO_2$, activity being measured by the $CO_2/CO$ ratio. The results (attached tables) show very high oxidation activities for the Pt-Containing catalysts.

| Effect of Platinum on Filtrol 75-F | | | |
|---|---|---|---|
| | Example | | |
| | 13 Base | 14 Base + 5 ppm Pt | 15 Base + 5 ppm Pt and 3% wt RE$_2$O$_3$ |
| Treatment: Hours | 4.0 | 4.0 | 4.0 |
| : Temp., °F. | 1400 | 1400 | 1400 |
| : % Steam | 100 | 100 | 100 |
| Conversion, % Vol | 80.3 | 76.1 | 79.9 |
| C$_5$+ Gasoline, % Vol | 66.7 | 63.5 | 66.1 |
| Total C$_4$, % Vol | 15.8 | 14.5 | 15.5 |
| Dry Gas, % Wt. | 7.0 | 6.3 | 6.9 |
| Coke, % Wt. | 3.57 | 3.88 | 3.91 |
| Hydrogen Factor | 30 | 39 | 36 |
| Recovery, % Wt | 96.5 | 97.0 | 96.7 |
| Oxidation Activity (1190° F., 2 gm Sample) | | | |
| CO$_2$/CO | 0.9 | 83 | 150 |
| Relative CO$_2$/CO | 1.0 | 92 | 167 |

| Effect of Platinum on Filtrol HS-7 and HS-10 | | | |
|---|---|---|---|
| | Example | | |
| | 16 HS-7 | 17 HS-7 + 5 ppm Pt | 18 HS-10 + 5 ppm Pt |
| Treatment: Hours | 4.0 | 4.0 | 4.0 |
| : Temp., °F. | 1400 | 1400 | 1400 |
| : % Steam | 100 | 100 | 100 |
| Conversion, % Vol | 81.6 | 84.4 | 80.3 |
| C$_5$+ Gasoline, % Vol | 66.4 | 66.2 | 65.4 |
| Total C$_4$, % Vol | 18.9 | 18.5 | 17.1 |
| Dry Gas, % Wt | 7.8 | 8.1 | 7.4 |
| Coke, % Wt | 4.44 | 5.55 | 4.17 |
| Hydrogen Factor | 35 | 37 | 45 |
| Recovery, % Wt | 95.9 | 97.2 | 96.3 |
| Oxidation Activity (1190° F., 2 gm Sample) | | | |
| CO$_2$/CO | 1.7 | 12 | 119 |
| Relative CO$_2$/CO | 1.0 | 7 | 70 |

EXAMPLES 19-31

Following is the preparation of a fluid cracking catalyst which served as the base and for the preparation of the other examples of this series:

15% rare earth zeolite Y (REY) in silica-zirconia-alumina-clay matrix 57.4% SiO$_2$, 2% ZrO$_2$, 0.6 Al$_2$O$_3$, 40% clay.

1860.4 grams of WP grade Georgia kaolin were added to 86.4 pounds (10.3 gallons) of deionized water and the whole was mixed thoroughly. 7972.9 grams of Q-brand, sodium silicate (containing 2310 grams SiO$_2$) were added to the water-clay slurry. The sodium silicate was added slowly over a period of thirty minutes while mixing. The clay was uniformly dispersed and coated with sodium silicate. The whole was heated to 120° F. and then 408.8 milliliters of aqueous sulfuric acid (97% wt H$_2$SO$_4$) were added at a uniform rate over a period of one hour while mixing. The whole was then held at 120° F. for one hour. 139.5 grams of aluminum sulfate in 560 milliliters of deionized water were added at uniform rate over a ½ hour period while mixing. To 178 grams of TAM sodium zirconium silicate (Na$_2$ZrSiO$_5$: 24-26% Na$_2$O; 46-49% Zr; 22-24% SiO$_2$) in 1730 milliliters deionized water were added 115 milliliters of sulfuric acid (97% wt H$_2$SO$_4$). This resulting slurry was then added to the clay-silicate gel at uniform rate over a ½ hour period while mixing. While agitating, additional sulfuric acid (97% wt H$_2$SO$_4$) was added over the next ½ hour to lower the pH to 4.5. 726.7 grams of REY (68% exchanged; i.e., 68% of the sodium content had been replaced with rare earth cations), which previously had been calcined at about 1200° F. for about 10 minutes, were slurried by dispersion in a Waring blender in 2180 milliliters of deionized water. (The REY had the following composition: $Al_2O_3=19.0\%$; $SiO_2=57.9\%$; $(RE)_2O_3=15.4\%$; $Na_2O=3.6\%$.) This slurry was added to the foregoing silica-zirconia-alumina-clay slurry while mixing. The blend was homogenized and then spray dried (inlet gas to spray drier about 700° F. and outlet gases about 350° F.) to produce microspheres of from about 1 to 140 microns in diameter, with an average particle size of about 62 microns.

The spray dried particles were then slurried with deionized water, decanted, and exchanged in a column with 40 gallons of a 5% aqueous ammonium sulfate solution to remove sodium. Thereafter the particles were washed with the water until the effluent was free of sulfate ions. The product was then dried in an oven at 250° F.

and $CO_2$, the oxidation activity being represented as the $CO_2/CO$ ratio (mole/mole).

The catalysts prepared, along with the data derived from the cracking and oxidation tests, are given in the following tables.

The cracking activity and selectivity data shown that addition of up to 10 ppm of any platinum group metal results in little or no decline in selectivity. Even at 50 ppm Pt, the hydrogen factor ($100 \times$ moles $H_2$/moles $C_1+C_2$), a sensitive measure of metal poisoning, has increased from 13 to only 40; many commercially acceptable cracking catalysts give similar hydrogen factors without an oxidation promoter.

Figure 6:
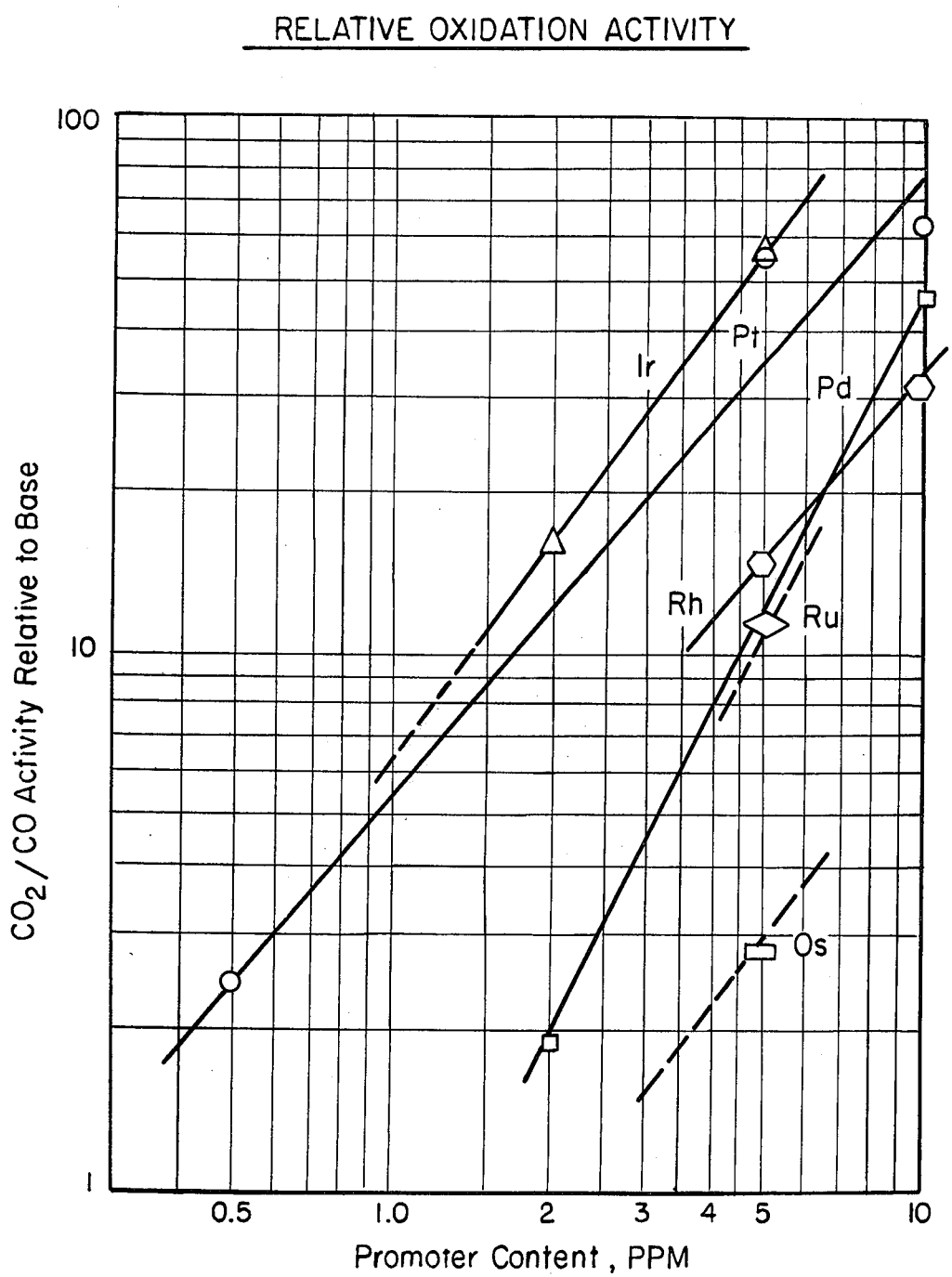

Each catalyst shows a significant oxidation activity, although the different metals have different activities. The activities are compared in FIG. 6 (log-log plot). The approximate relative activities are:

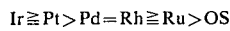

$Ir \geqq Pt > Pd = Rh \geqq Ru > OS$

| Example | 19 | 20 | 21 | 22 | 23 | 24 | 25 | 26 | 27 | 28 | 29 | 30 | 31 |
|---|---|---|---|---|---|---|---|---|---|---|---|---|---|
| Promoter | Base | Pt | Pt | Pt | Pt | Pd | Pd | Ir | Ir | Rh | Rh | Os | Ru |
| Promoter Content, ppm | .0 | .5 | 5.0 | 10.0 | 50.0 | 2.0 | 10.0 | 2.0 | 5.0 | 5.0 | 10.0 | 5.0 | 5.0 |
| Cracking Test[1] | | | | | | | | | | | | | |
| Conversion, % Vol | 79.8 | 78.3 | 76.6 | 75.5 | 76.9 | 79.2 | 77.7 | 78.0 | 76.2 | 76.7 | 79.3 | 74.7 | 79.2 |
| C5+ Gasoline, % Vol | 68.8 | 64.8 | 64.9 | 62.2 | 64.2 | 66.0 | 65.8 | 65.6 | 63.1 | 64.5 | 65.5 | 61.3 | 67.2 |
| Total Butanes, % Vol | 14.5 | 15.8 | 15.3 | 16.4 | 15.2 | 15.9 | 15.1 | 14.5 | 15.9 | 15.3 | 15.8 | 15.1 | 15.7 |
| Dry Gas, % Wt | 6.7 | 7.0 | 6.5 | 6.8 | 6.6 | 7.1 | 6.4 | 6.4 | 6.5 | 6.6 | 6.9 | 7.3 | 6.1 |
| Coke, % Wt | 2.8 | 3.4 | 2.7 | 3.1 | 3.3 | 3.0 | 2.7 | 3.3 | 3.3 | 2.8 | 3.4 | 2.7 | 2.8 |
| Hydrogen Factor[2] | 13 | 17 | 22 | 26 | 40 | 17 | 18 | 15 | 19 | 13 | 13 | 15 | 13 |
| Oxidation Activity[3] | | | | | | | | | | | | | |
| $CO_2/CO$ at 1240° F. | 0.77 | 1.8 | 43 | 49 | 1000 | 1.5 | 36 | 12 | 43 | 11 | 26 | 2.2 | 8.6 |
| Relative $CO_2/CO$ Activity | 1.0 | 2.4 | 56 | 64 | 1304 | 1.9 | 47 | 16 | 57 | 15 | 34 | 2.8 | 11 |

[1]Fixed fluidized bed, WCMCGO, 8.3 WHSV, 3 C/O, 920° F.
[2]Moles $H_2$/Moles $C_1 + C_2 \times 100$
[3]1240°F., 215 cc air/min, 4 g catalyst-coked catalyst from cracking test was blended with fresh steamed catalyst to give 0.65% wt C on total sample A sample of the product analyzed as follows:

| | Wt percent |
|---|---|
| Na | 0.05 |
| $(RE)_2O_3$ | 1.95 |
| $NH_3$ | 0.64 |

Platinum-group metals were incorporated by impregnating the dried solid base catalyst with aqueous solutions containing the appropriate quantities of metal salts. The volume of impregnating solution was sufficient to just fill the pores of the catalyst, so that metal retention was quantitative. The particular salts were $[Pt(NH_3)_4]Cl_2$, $[Pd(NH_3)_4]Cl_2$, $[Ir(NH_3)_5Cl]$ $Cl_2$, $[Rh(NH_3)_5Cl]Cl_2$, $[Os(NH_3)_6]I_3$, and $[Ru(NH_3)_5Cl]Cl_2$.

Each catalyst was steamed in a fluidized bed for 4 hours at 1400° F. at 0 psig with 100% steam, after being heated to 1400° F. in a stream of nitrogen. The cracking activity and selectivity was tested by using the steamed catalysts to crack a wide-cut Mid-Continent gas oil (29.2° API) in a fixed fluidized bed at 920° F. 3 C/O, 8.3 WHSV. The oxidation activities were determined by blending the coked catalyst from the cracking test with fresh steamed catalyst to 0.65% wt carbon, passing a stream of air at 215 cm/min through a fluidized bed of 4 gms of the blend at 1240° F. until all the carbon had been removed. The effluent gas was analyzed for CO

EXAMPLES 32-45

Platinum—Group and Transition Metals Incorporated on Fresh DHZ-15

A commercial cracking catalyst, DHZ-15, manufactured by the Davison Chemical Division of W. R. Grace & Co., was impregnated with aqueous solutions of $Pt(HN_3)_4Cl_2$, $Cr(NO_3)_3.6\ H_2O$, $MnCl_2.4H_2O$ and $Ni(NO_3)_2.4\ H_2O$ to the levels listed in the following table. The impregnating solution volume was sufficient to just fill the pore of the catalyst, so that metal retention was quantitative. The catalysts were steam treated, tested for cracking activity and selectivity, and oxidation activity as described in Examples 19-31.

Incorporation of Pt to 1, 5 and 10 ppm shows very high oxidation activity; cracking activity and selectivity show no degradation.

At a Cr level of 10,000 ppm (1% wt Cr), a severe loss in activity and some loss in selectivity have occured, while only a minor increase in oxidation activity is observed, particularly in comparison to Pt (even at 1 ppm). A similar result is obtained with Mn, where substantially no oxidation activity is evident even at 10,000 ppm. Incorporation of Mn has, however, resulted in major losses in cracking activity.

Incorporation of nickel results in substantially no increase in oxidation activity, but results in serious losses in cracking selectivity, particularly with respect to increased coke yields and hydrogen factor.

TABLE

| Example | 32 | 33 | 34 | 35 | 36 | 37 | 38 | 39 | 40 | 41 | 42 | 43 | 44 | 45 |
|---|---|---|---|---|---|---|---|---|---|---|---|---|---|---|
| Promotor | Base | Pt | Pt | Pt | Pt | Pt | Pt | Cr | Cr | Cr | Ni | Ni | Mn | Mn |
| Promoter Content, ppm | .0 | .2 | .4 | .6 | 1.0 | 5.0 | 10.0 | 500 | 2,000 | 10,000 | 100 | 1,000 | 5,000 | 10,000 |
| Cracking Test | | | | | | | | | | | | | | |
| Conversion, % Vol | 71.8 | 74.2 | 73.9 | 75.2 | 75.8 | 71.0 | 77.0 | 74.8 | 77.6 | 60.8 | 73.9 | 76.5 | 67.4 | 56.4 |
| $C_5+$ Gasoline, % Vol | 58.7 | 56.6 | 56.8 | 57.0 | 61.9 | 60.6 | 62.2 | 61.2 | 62.1 | 49.9 | 58.8 | 58.2 | 55.6 | 48.4 |
| Total Butanes, % Vol | 15.2 | 16.8 | 16.4 | 17.8 | 16.5 | 13.2 | 17.0 | 15.6 | 16.6 | 12.0 | 15.5 | 16.5 | 13.4 | 10.5 |
| Dry Gas, % Wt | 6.4 | 8.0 | 7.8 | 8.1 | 6.9 | 6.2 | 7.2 | 6.8 | 7.3 | 5.3 | 6.7 | 7.8 | 6.0 | 4.9 |
| Coke, % Wt | 3.2 | 4.4 | 4.3 | 4.6 | 3.3 | 3.0 | 3.4 | 3.3 | 3.6 | 3.0 | 3.8 | 5.7 | 2.9 | 2.2 |
| Hydrogen Factor | 26 | 22 | 22 | 23 | 27 | 23 | 30 | 23 | 21 | 23 | 45 | 142 | 23 | 23 |
| Oxidation Activity | | | | | | | | | | | | | | |
| $CO_2/CO$ at 1240° F. | 1.7 | 2.1 | 2.8 | 3.4 | 11 | 80 | 172 | 1.8 | 1.5 | 3.8 | 2.0 | 1.9 | 0.9 | 1.8 |
| Relative $CO_2/CO$ Activity | 1.0 | 1.3 | 1.67 | 2.1 | 6.7 | 48 | 103 | 1.1 | 0.9 | 2.3 | 1.2 | 1.1 | 0.5 | 1.1 |

EXAMPLES 46 and 47

As has been stated, the oxidation promoters of this invention are very effective for substantially complete conversion of CO to $CO_2$ in FCC regenerators. But, they can also be used to advantage in applications where only partial conversion of CO is desired, as for example, in units which are temperature limited by their materials of construction. The substantial value of operating in a partial CO conversion mode is illustrated by these examples, which demonstrate the product yield benefits obtained in an active commercial test.

The test (Example 46) was made in an FCC unit of the Swirl regenerator type, corresponding to FIGS. 1, 2 and 3 of the Drawings, which had been operating with Pt promoted DHZ-15 catalyst manufactured by the Davison Division of W. R. Grace & Company. The test run (Example 46) was made, after adding as makeup 66.8 tons of DHZ-15 promoted with 0.14 ppm Pt for over a period of 8 days, followed by 39.6 tons of DHZ-15 promoted with 0.4 ppm Pt over the next 6 days, followed by 37.7 tons of DHZ-15 promoted with 0.6 ppm over the next 7 days, and 21.6 tons of DHZ-15 promoted with 0.8 ppm over the next 5 days. At this point, the amount of nickel in the total catalyst inventory was about 190 ppm and the amount of vanadium was about 240 ppm. Platinum was 0.14 ppm, by calculation.

A second test run (Example 47) was made in the same FCC unit after further addition of 42.2 tons of DHZ-15 promoted with 0.8 ppm Pt over a period of 7 days, followed by 21.3 tons of DHZ-15 promoted with 2 ppm Pt over the next 3 days. The platinum content was 0.31 ppm, by calculation.

Example 46 involves a low level of catalytic conversion of CO. Example 47 test, which was made when the unit contained catalyst with a higher level of oxidation activity as indicated by the $CO_2/CO$ ratio in the flue gas, showed a substantial increase in conversion, a reduction in coke yield, an increase in gasoline yield and a reduction in carbon on regenerated catalyst even though this unit was still operated with only partial catalytic conversion of CO.

The results are shown in the following table.

TABLE

| | Example 46 | Example 47 |
|---|---|---|
| Fresh Feed Rate, B/D | 42,000 | 42,300 |
| Coker in Feed, % Vol | 23.9 | 24.7 |
| Fresh Feed Gravity, °API | 22.5 | 22.8 |
| Reactor Temp., °F. | 978 | 981 |
| Avg. Regenerator Dense Bed Temp. °F. | 1168 | 1228 |
| Carbon on Regen. Catalyst, % Wt. | 0.36 | 0.17 |
| Flue Gas $CO_2/CO$ Ratio | 1.2 | 1.7 |

TABLE-continued

| | Example 46 | Example 47 |
|---|---|---|
| Conversion, % vol F.F. | 66.2 | 69.4 |
| Product Yields | | |
| $C_2$ and Lighter, F.O.E./B. | 0.064 | 0.070 |
| $C_3$ % vol F.F. | 3.5 | 3.9 |
| $C_3^=$ % vol F.F. | 6.4 | 7.1 |
| $iC_4$ % vol F.F. | 4.1 | 4.7 |
| $nC_4$ % vol F.F. | 1.5 | 1.7 |
| $C_4^=$ % vol F.F. | 7.5 | 7.9 |
| $C_5+$ Gasoline % vol F.F. | 45.3 | 47.3 |
| Light cycle oil % vol F.F. | 28.5 | 25.5 |
| Clarified Slurry oil % vol F.F. | 5.3 | 5.1 |
| Coke, % wt F.F. | 6.7 | 6.4 |

The incremental yield of gasoline of 2% obtained in Example 47, compared to Example 46, calculates a projected increase in production of about 15,000,000 gallons per year for this unit alone. The unit could not have been operated to obtain these benefits without the use of the catalyst of this invention.

Figure 5:
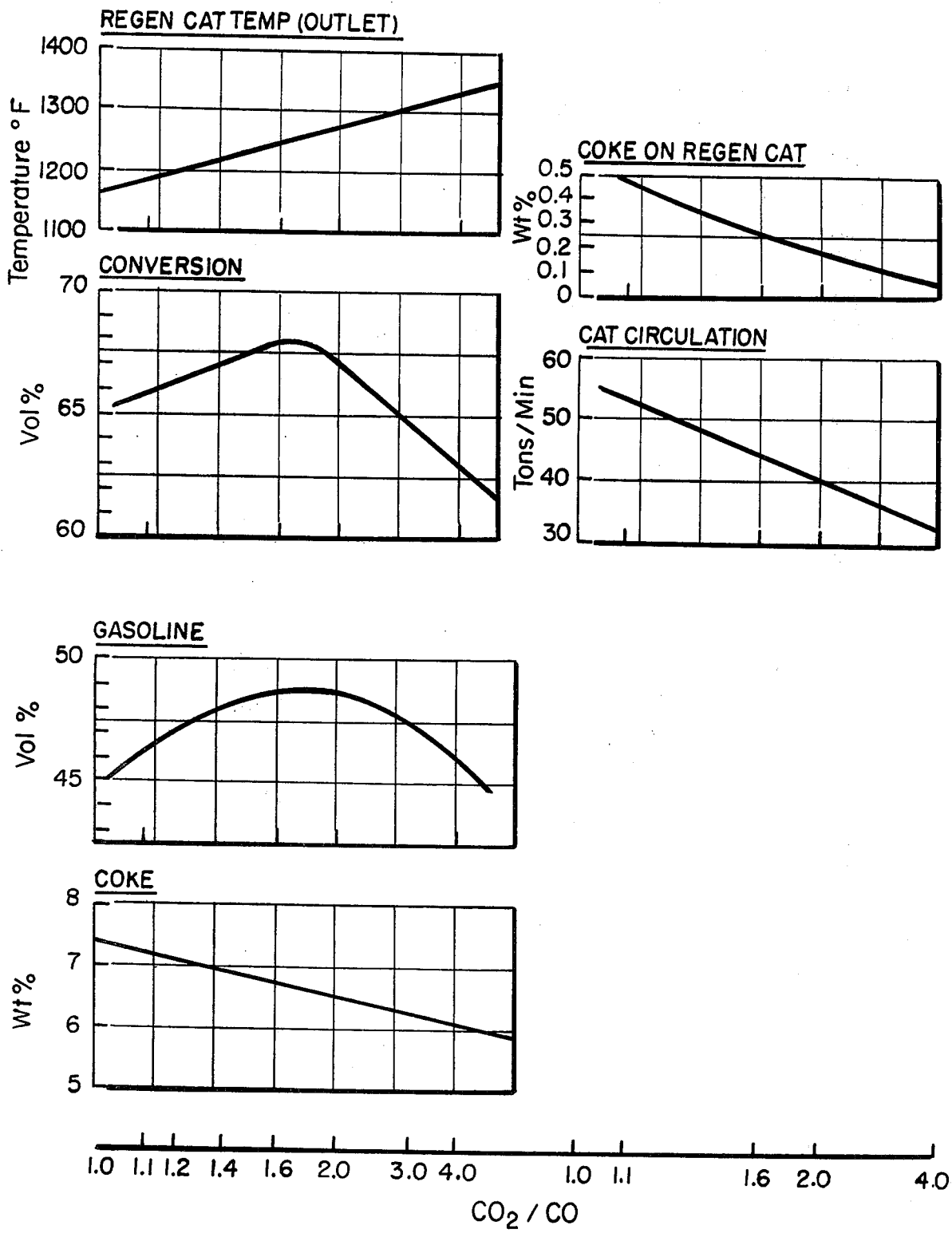

It will also be seen that addition of platinum promoted catalyst to a system which already contained CO promoter (Ni, V) did not, as might be expected, result in loss of liquid yield until the catalyst circulation was so far reduced that catalyst to oil ratio became controlling and caused loss of gasoline production. These effects are dramatically illustrated by the graphs of FIG. 5, showing clearly defined maxima in conversion and gasoline yield as $CO_2/CO$ values are reduced.

SPECIFIC EMBODIMENTS

The improved process and method of control of this invention may be used with any of the fluid catalytic cracking units, and variations thereof, illustrated in the drawing, provided they are equipped with suitable sensing means and control means as hereinafter described. The FCC unit shown in FIG. 1, for example, is suitable, as are the units shown in FIGS. 3, 4 and 17. The swirl regenerator shown in FIG. 2 and modifications thereof may be incorporated with any of the FCC units. The catalyst may be regenerated to different levels of carbon on regenerated catalyst and the $CO_2/CO$ ratio of the flue gas exiting from line 52 of the regenerator in FIGS. 1, 3, 4 and 17 may vary compatibly with the metallurgical or other constraints of the particular unit. In all cases, means, such as illustrated in FIG. 17, are provided for controlled injection of metal as hereinabove described to promote CO burning.

A detailed description of an embodiment implementing this invention for a riser type reactor is in the paragraphs set forth hereinbelow.

The kinetic lumping scheme described in Ser. No. 529,055 filed Dec. 3, 1974 is used to calculate the conversion, product selectivity and coke make for the riser reactor. The proper boundary conditions, determined by the metallurgical and other constraints of the particular unit to be used, is applied to the described kinetic framework. These boundary conditions comprise: the appropriate reactor configuration; catalyst activity; the mix temperature of catalyst and oil; and may include the slip between catalyst particles and oil vapor. Equations describing catalyst slip, adiabatic heats of reaction, and molar expansion allow the computation of temperature, pressure, conversion, product selectivity and coke make as a function of distance up the length of the riser.

The adiabatic nature of the riser entails solving the coupled heat of cracking equations and the rate of cracking equations. Gasoline formation reactions are endothermic with heat of reaction, $\Delta H_g = 450$ BTU/lb of gasoline formed, and C lump formation reactions are exothermic with heat of reaction $\Delta H_c = -60$ BTU/lb of C lump formed.

The equations for the adiabatic riser temperature become $$\frac{dT_r}{dX} = C_{pi}L_i + F_c C_{pc}] = -\sum_i \Delta H_i r_i \quad (1)$$

Furthermore the flaring of the riser gives an increase in area with a reduction in velocity of gas oil molecules and increased residence time. This is accounted for by the change of the superficial mass velocity of the gas oil molecules. The pressure, catalyst age, catalyst density, and void fraction at any distance X up the riser are computed from the slip relationship and provide values of P, $t_c$, $C_c$, and $G_v$ needed in the integration of the differential equation shown below. The slip relationship is given by $$V_c = \frac{SV_G'}{\epsilon}$$

where $V_c$ is catalyst velocity, S is ratio of the velocity of the catalyst relative to the wall to the velocity of the gas relative to the wall, $V_G'$ is the superficial gas velocity, and $\epsilon$ is the void fraction. In matrix notation the equations for the rate of cracking are:

$$\frac{da}{dX} = \frac{1}{1 + \underline{K}_{Ah} C_{Ah}} \frac{P \overline{MW}}{RT} \frac{\Phi(t_c) C_c L}{G_v} \underline{K} a \quad (2)$$

where $a$ = composition vector consisting of $j$ lumped species
$(a_j$ = moles $j/g$ gas)
$P_h$
$N_h$
$A_h$
$C_{Ah}$
$P_l$
$N_l$
$A_l$
$C_{Al}$
$G$
$C$ $X$ = dimensionless riser reactor length
$P$ = absolute pressure (atmospheres)
$R$ = gas constant (32.05 atm. cm$^3$/g-mole °K.)
$T$ = absolute temperature (°K.)
$G_v$ = superficial mass flow rate of vapor gm/(cm$^2$ cross section) (hr)
$C_c$ = gms catalyst/cm$^3$ bed, a function of slip
$L$ = riser length, cm -continued $\overline{MW}$ = mean molecular weight of the mixture = $\frac{1}{\sum_j a_j}$ $\underline{K}$ = matrix of charge stock invariant rate constants
(g catalyst/cm$^3$)$^{-1}$ (hr)$^{-1}$
(a function of $T$, catalyst type, residual carbon on regenerated catalyst, Basic $N$ poison, pressure, metals, etc. The effects of temperature, Basic $N$ poisoning, catalyst type and residual carbon on regenerated catalyst on the $K$ matrix are detailed in their corresponding sections.)
$t_c$ = age of catalyst at distance X, hr
OPP = oil partial pressure at inlet, atmospheres
$\Phi(t_c)$ = catalyst decay as a function of catalyst residence time, and oil partial pressure $\frac{\alpha}{(1 + \beta_o t_c \gamma)(OPP)^m}$
where $\alpha$, $\beta_o$, and $\gamma$ and $m$ are constants for a given catalyst.
$K_{Ah}$ = adsorption term associated with the concentration of aromatic rings in the 650° F.$^+$ fraction, $C_{Ah}$
$C_{pi}$ = specific heat of lump $i$, (Btu/lb °F.)
$L_i$ = flow rate of lump $i$, (lbs/sec)
$F_c$ = flow rate of catalyst, (lbs/sec)
$C_{pc}$ = specific heat of catalyst (Btu/lb °F.)
$\Delta H_j$ = heat of reaction associated with formation of lump $i$
$r_i$ = rate of formation of lump $i$ As discussed in detail in Ser. No. 529,055, use of the above equations predicts the compositional changes of the individual lumps as well as the total gasoline, LFO, light end distribution and coke. From the viewpoint of recycle, it is important to be able to predict the polynuclear aromatic rings in the HFO, % $C_{ah}$, as this lump primarily determines increased coke production from recycle charge stocks. Since the lumped compositions of these fractions are adequately predicted, recycle situations encountered commercially are handled with confidence.

Figure 7:
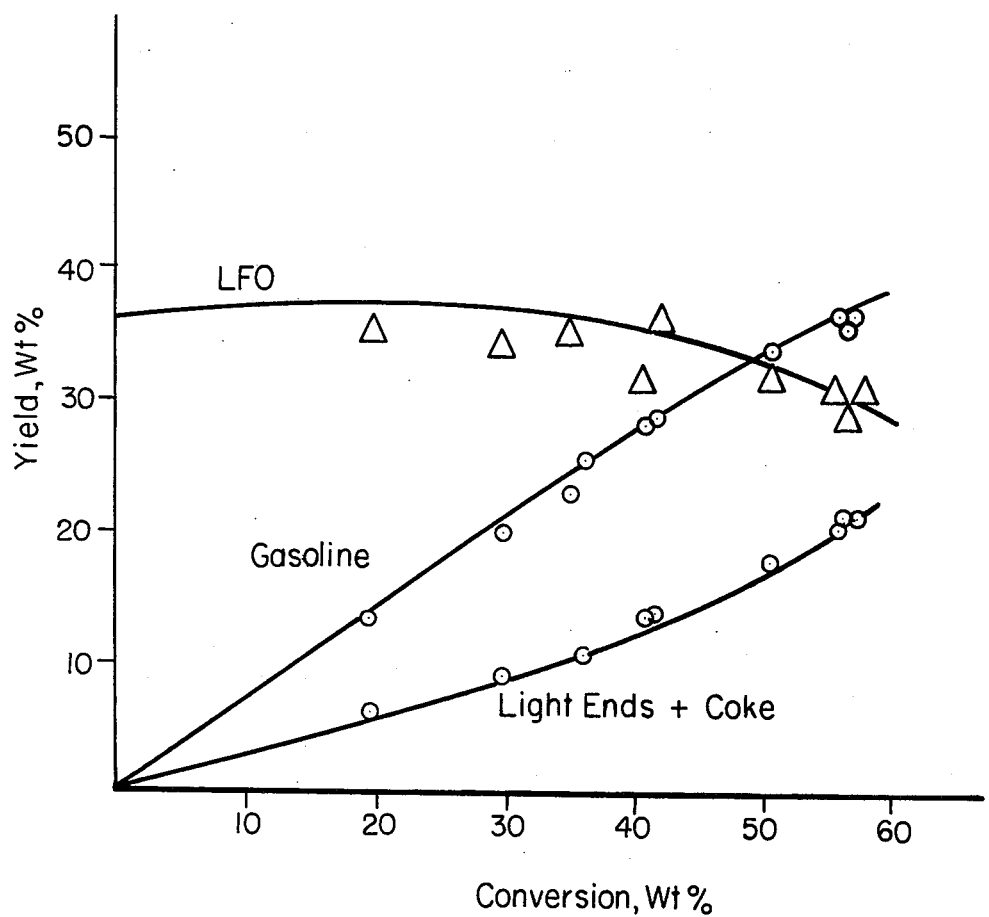

Commercial sampling data were compared with predictions and show the validation of the kinetic scheme as evidenced by FIG. 7.

The reactor calculation is followed by a calculation of the coke burning in the regenerator. At steady state the rate of carbon burned in the regenerator must equal the rate of carbon formed in the reactor.

The rate of carbon burned in the regenerator is $$R_{cb} = \alpha_{co} \frac{F_a M_c}{M_g} (.21 - P_{o2}) \quad (3)$$

where $F_a$ is the air flow rate, $P_{o2}$ is the oxygen concentration at the outlet of the regenerator, $\alpha$ is the stoicheometric carbon to oxygen ratio, and $M_c$ and $M_g$ are the molecular weights of carbon and air, respectively.

For stable operation of the system, it is important to have proper control of air rate and limit excess oxygen to prevent afterburning. The excess oxygen may typically be calculated for a well mixed bed and plug flow of air by the equation.

$$P_{o2} = .21 \exp\left[\frac{-a_{cb} C_{rg} M_g H_{rg} e^{\frac{-E_{cb}}{RT_{rg}}}}{.21 F_a M_c \alpha_{co}}\right] \quad (4)*$$

For both conventional and partial CO burning the flue gas temperature is extremely sensitive to excess oxygen level. For this reason the outlet oxygen is constrained to levels of 0.1–0.2% in the operating range of the regenerator. This constraint is important in calculating the overall heatbalanced operation.

The regenerator dense bed outlet temperature is calculated from the heat balance.

$$T_{rg} = \frac{R_{cb} Q_{cb} + C_{pc} F_c T_{rx} + C_{pg} F_a T_a}{C_{pc} F_c + C_{pg} F_a} \quad (5)*$$

wherein $Q_{cb}$, the heat of combustion, depends upon the $CO_2/CO$ ratio, and the percent hydrogen in the coke.

$$Q_{cb} = \frac{n}{M_c + n} \Delta H_{H2} + \frac{M_c}{M_c + n} \left[ \frac{1}{\beta + 1} \Delta H_{co2} + \frac{\beta - 1}{\beta' + 1} \frac{\Delta}{} H_{co} \right] \quad (6)$$

To calculate the regenerator operating conditions and heat balance conditions consistent with the reactor performance, choose a level of carbon on regenerated catalyst $C_{rg}$ and adjust the air flow rate $F_a$ to satisfy equations (3) and (4).

The regenerator temperature $T_{rg}$ is not independent but must be found from equation (5). When $F_a$ is found, equation (4) is used to check the $P_{o2}$ constraint. If it is not the proper value, the level of $C_{rg}$ is adjusted in subsequent calculations until convergence is established on the level of $P_{o2}$. This is shown schematically below.

Regenerator Heat Balance Convergence Loop

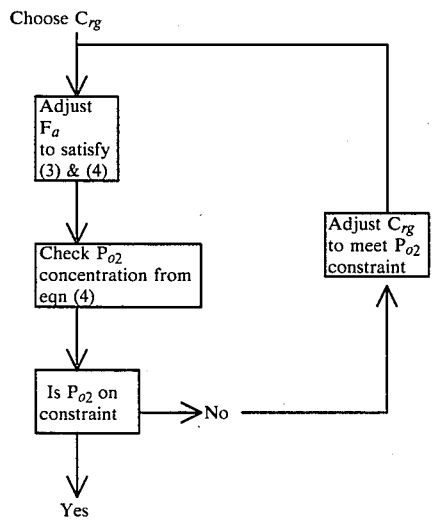

Once the heat balance of the regenerator is established, the oil to riser temperature, $T_f$ may be easily calculated from the following equation from the specified FCC reactor inlet mix temperature, $T_{mix}$.

$$T_{mix}(F_c C_{pc} + F_t C_{pf}) = T_{rg} C_{pc} F_c + T_f C_{pf} F_t - F_t \lambda_o \quad (7)*$$

*In (7), $F_t$ is the combined feed rate, $C_{pf}$ the specific heat of the feed, and $\lambda_o$ the heat of vaporization of the feed.

This completes the main heat balance loops and the results are the complete calculated process operating conditions and product yields for a given charge stock and catalyst and a specified given set of process conditions such as reactor temperature, unit inventory, air inlet temperature. A typical operating unit calculation is shown in Appexdix I where the process variables that have to be specified are shown with two stars (**). All other information including product yields, regenerator temperature, catalyst and vapor residence times, are calculated from the basic kinetic framework coupled with the equations defining reactor and regenerator performance. This typical case can be calculated in less than 20 seconds.

By changing the values of certain process inputs such as reactor top temperature or catalyst circulation for a given charge stock, different steady-state operating points, all of which have different product distributions, are generated. By this procedure, a number of operating points are systematically generated over a wide range of process conditions by continually changing the process input, calculating the process conditions for heat balance and their associated product yields, and summarizing the results in process maps such as those shown on FIGS. 8 and 9. These maps are typical and are shown as contours of constant product yield and process operating condition, and are plotted versus reactor top temperature and combined feed temperature as illustrative since these are most normally controlled operating conditions in FCC operation.

Figure 8:
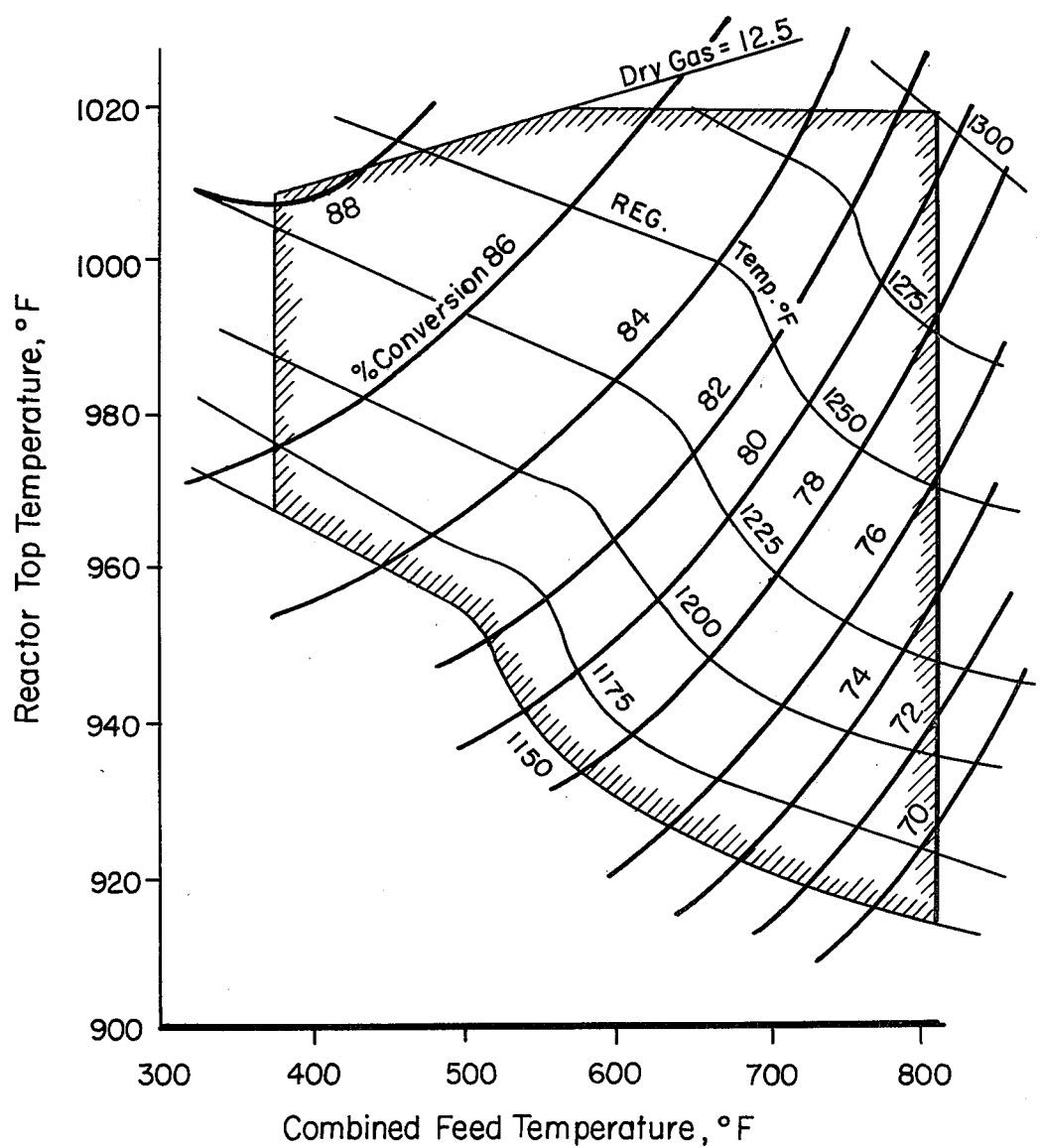
Figure 9:
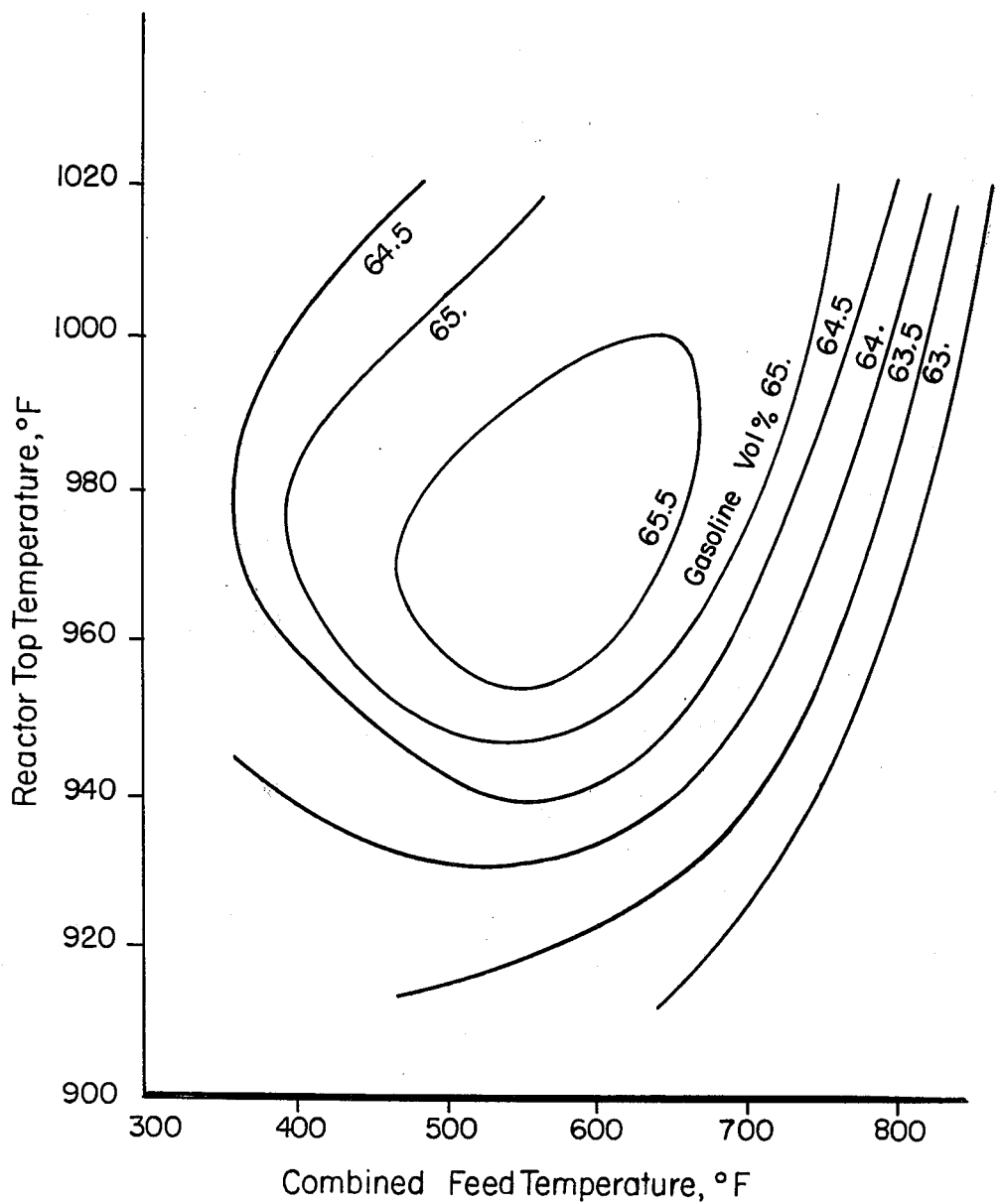

Since there are a great deal of product and process variables defining FCC operation as shown in Appexdix I, only some of the more important ones are shown in the operating maps, FIGS. 8 and 9. This particular map has a wide range of operable cases which are those that fall within the hatched area defined by a maximum reactor temperature, a minimum regenerator temperature, maximum and minimum feed preheat capability, and maximum dry gas make allowable. Those constraints are superimposed over the calculation since they involve metallurgical, compressor and equipment limits of the unit and are not involved in the kinetic heat balance calculation.

It can be seen from FIG. 9 that for maximum gasoline yield there is a unique optimum that is immediately identified as being at roughly 550° F. feed preheat and 980° F. reactor top temperature.

This optimum is dependent on the properties of the feed being charged to the unit. For a different charge stock the map will be radically different such as in FIG. 10 where the maximum gasoline yield occurs at 475° F. feed preheat and 1010° F. reactor top temperature.

Figure 10:
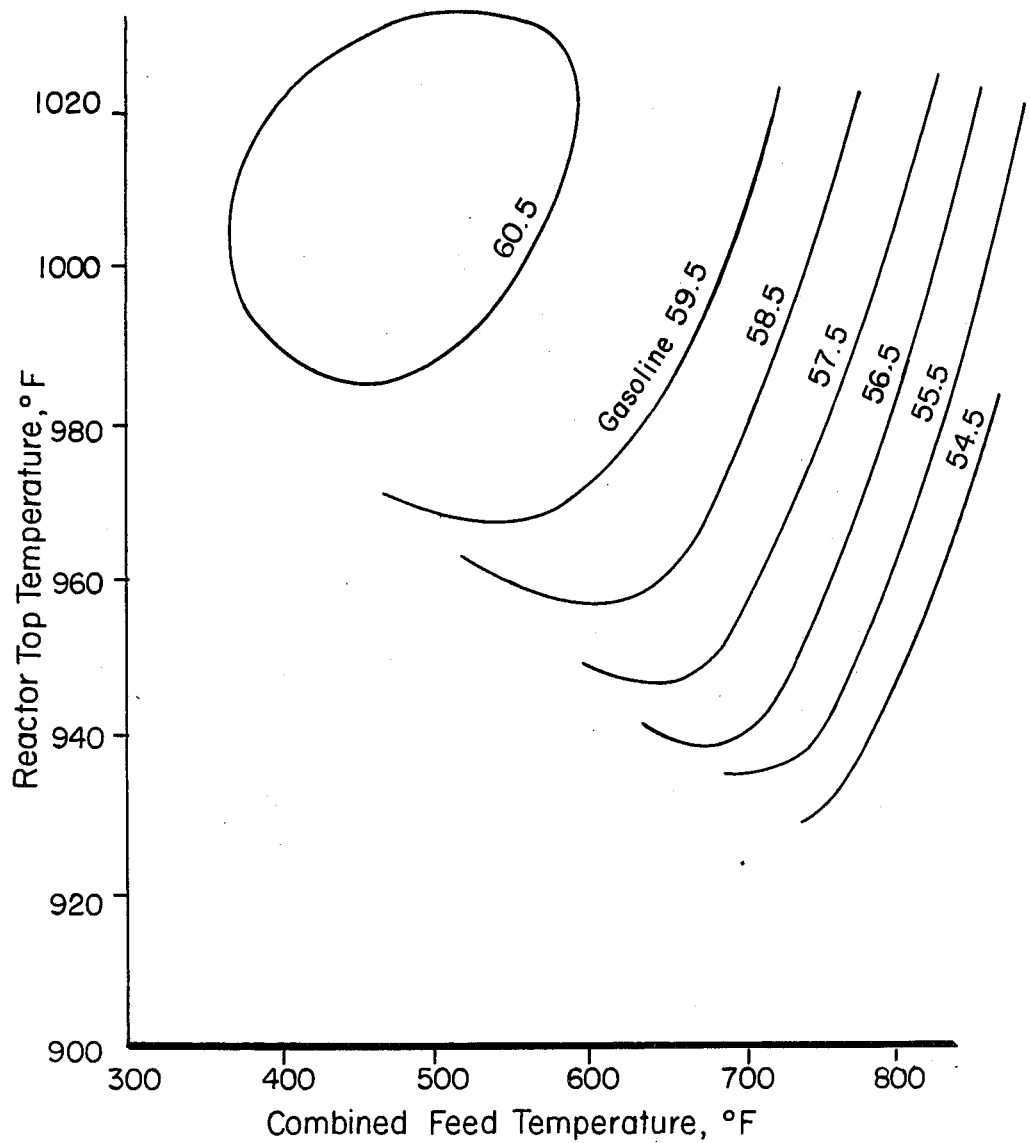

FIGS. 8, 9 and 10 are for conventional operation in which the $CO_2/CO$ ratio is constant. Additional operating maps are calculated by varying $CO_2/CO$ ratio and generating similar sets of conversion, product selectivity and FCC operating condition specifications. Normally the $CO_2/CO$ ratio is not controllable, but use of the CO promoter at the proper level of activity permits unexpected flexibility in control of $CO_2/CO$ ratio by varying air rate to the regenerator. Thus, in addition to the maps generated above, a new dimension, that of $CO_2/CO$ level, is added.

Figure 11:
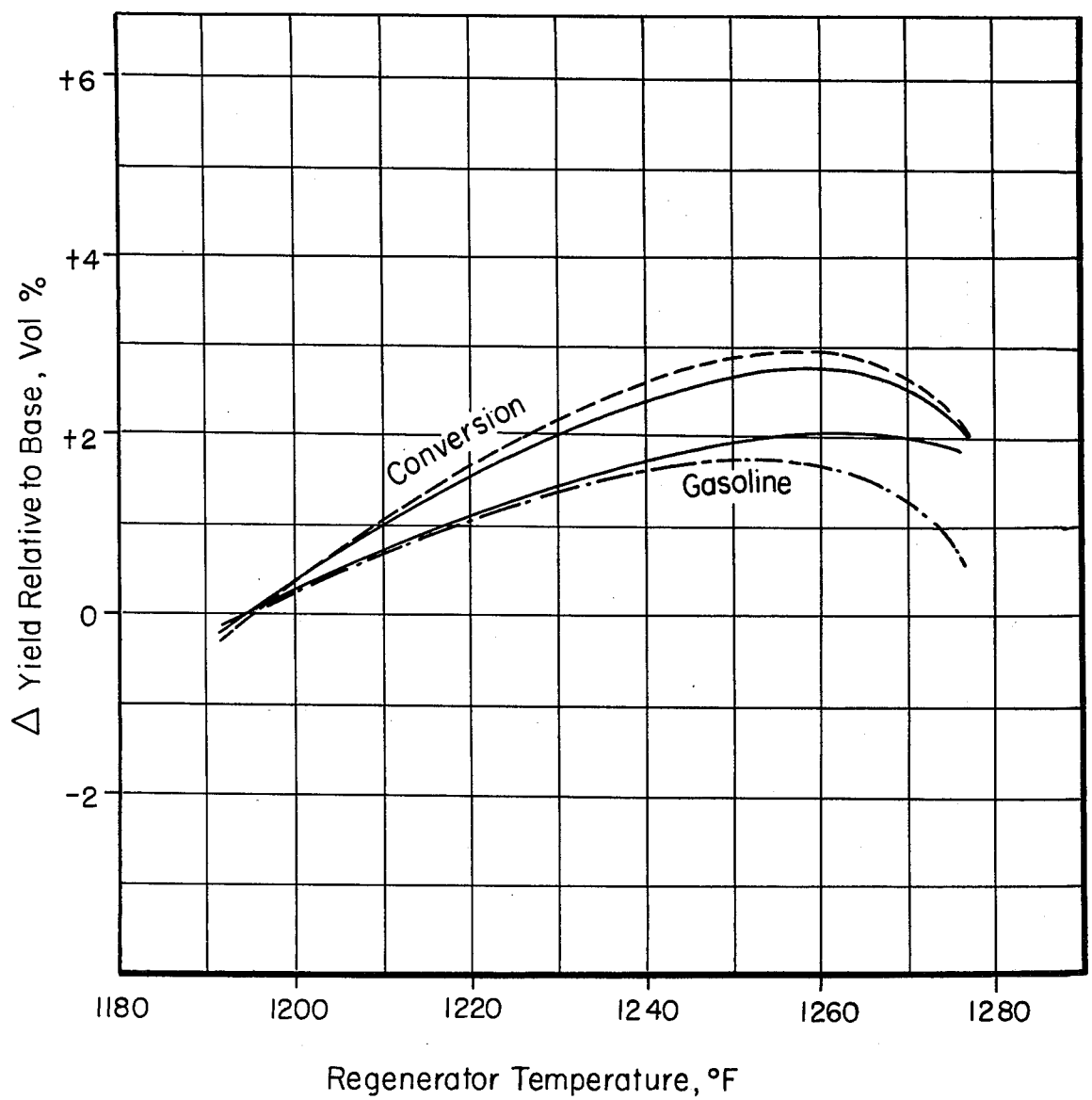

A plot of conversion and gasoline yield generated by the above calculation procedure for a fixed reactor top temperature and oil preheat temperature is shown versus the dense bed regenerator outlet temperature in FIG. 11. These predictions are very close to those actually observed in the test described in examples 46 and 47.

The maximum in the conversion and gasoline levels occurs at an intermediate value of $CO_2/CO$ of 2 in the partial CO burning range. In the full CO burning mode, the conversion and gasoline decrease, although they will usually be higher than the conventional mode with no CO promoted catalyst. This maximum cannot be attained with thermal burning since there is no continuous variation or control of $CO_2/CO$ ratio as observed with the CO burning catalyst. Instead there is either a conventional operation with lowr regenerator temperature and normal $CO_2/CO$ ratio, or complete CO burning with extremely high ($>100$) $CO_2/CO$ ratio.

The location of the maximum calculated with the kinetic predictive model insures a valid optimum for the operation of the unit. Because the kinetic predictive model is invariant, it is used reliably with all charge stocks. For these reasons, it is preferred to use the kinetic predictive model in the improved process or method of control of this invention. However, a correlative model may be used to estimate optimum operating conditions, especially if the feedstock does not vary significantly.

The control of $CO_2/CO$ ratio can only be obtained with the proper level of CO promoter activty. The proper level of promoter to realize this control is calculated based on the kinetics of carbon and CO combustion. The rate of addition of CO combustion promoter to the cracking catalyst inventory is set to obtain this proper level of active promoter, and effect control of $CO_2/CO$ ratio. Knowledge of the decay characteristics of promoter is utilized to perform these calculations.

To calculate the amount of active promoter necessary to control $CO_2/CO$ ratio, a regenerator kinetic calculation that combines dense bed carbon and catalytic CO burning, dilute phase catalytic and thermal CO burning, and the internal regenerator flow patterns is utilized. This calculation procedure relies on the carbon burning kinetics which depend on the temperature, carbon level, and oxygen level in the regenerator, and on the CO burning kinetics which also depend on carbon, temperature and oxygen levels but in addition depends on the CO concentration and CO promoter level. The details of these kinetics are reported in the literature, and are to be found in articles appearing in Journal of Catalysis, Vol. 6, No. 2, pp. 227–236; and in Journal of Catalysis, Vol. 6, p 425–430 (1966), the entire contents of which are incorporated herein by reference. The Journal of Catalysis is published by Academic Press, New York, New York.

Figure 12:
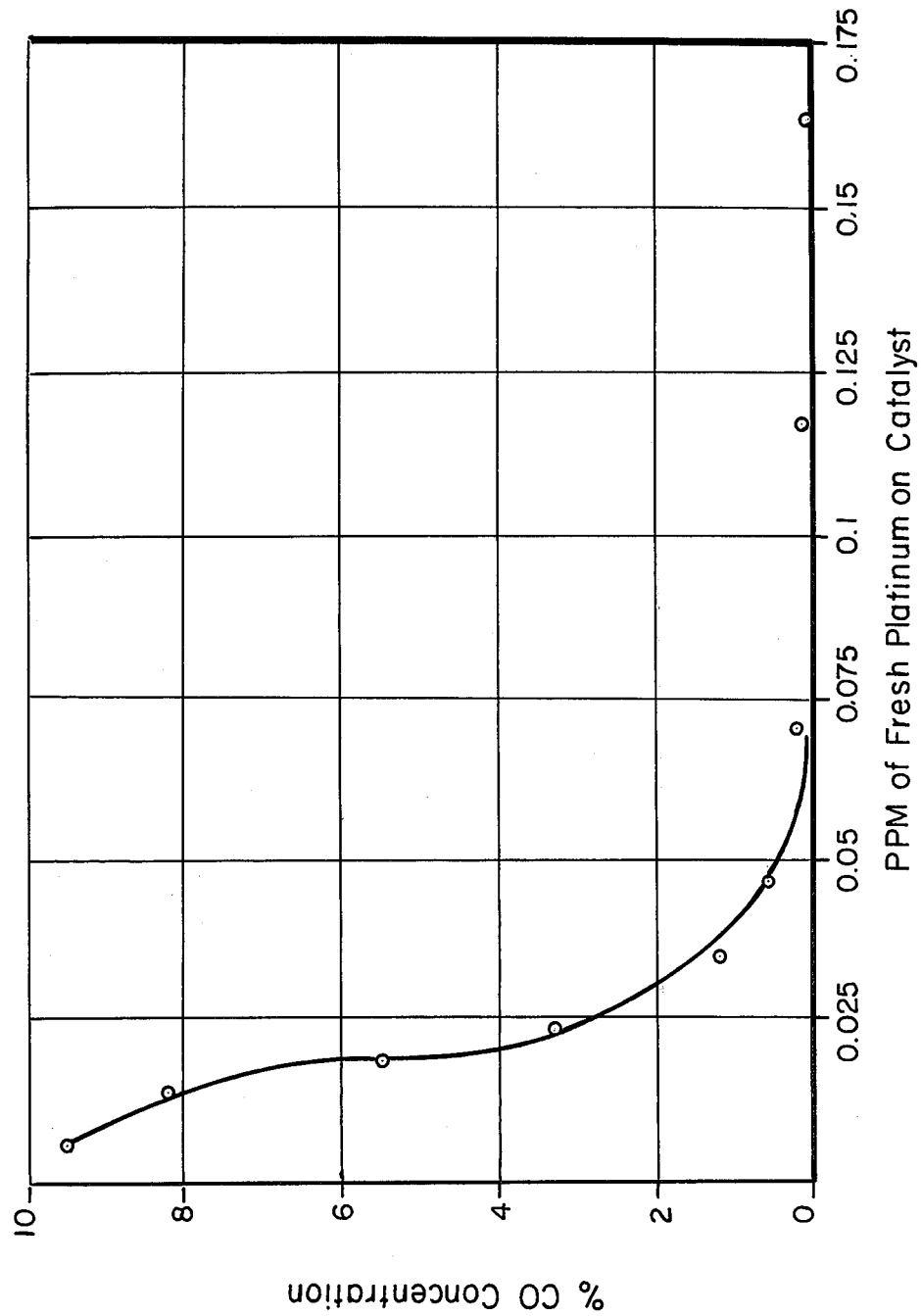

A typical calculation for the CO outlet concentration in Vol % of flue gas from a commercial dense bed regenerator is shown in FIG. 12, where the CO level decreases as the promoter level increases. It should be noted that this calculation includes estimated kinetics of fresh CO platinum promoter catalyst so that the absolute level of promoter necessary to achieve a desired CO concentration level will increase as the catalyst CO activity declines.

Figure 13:
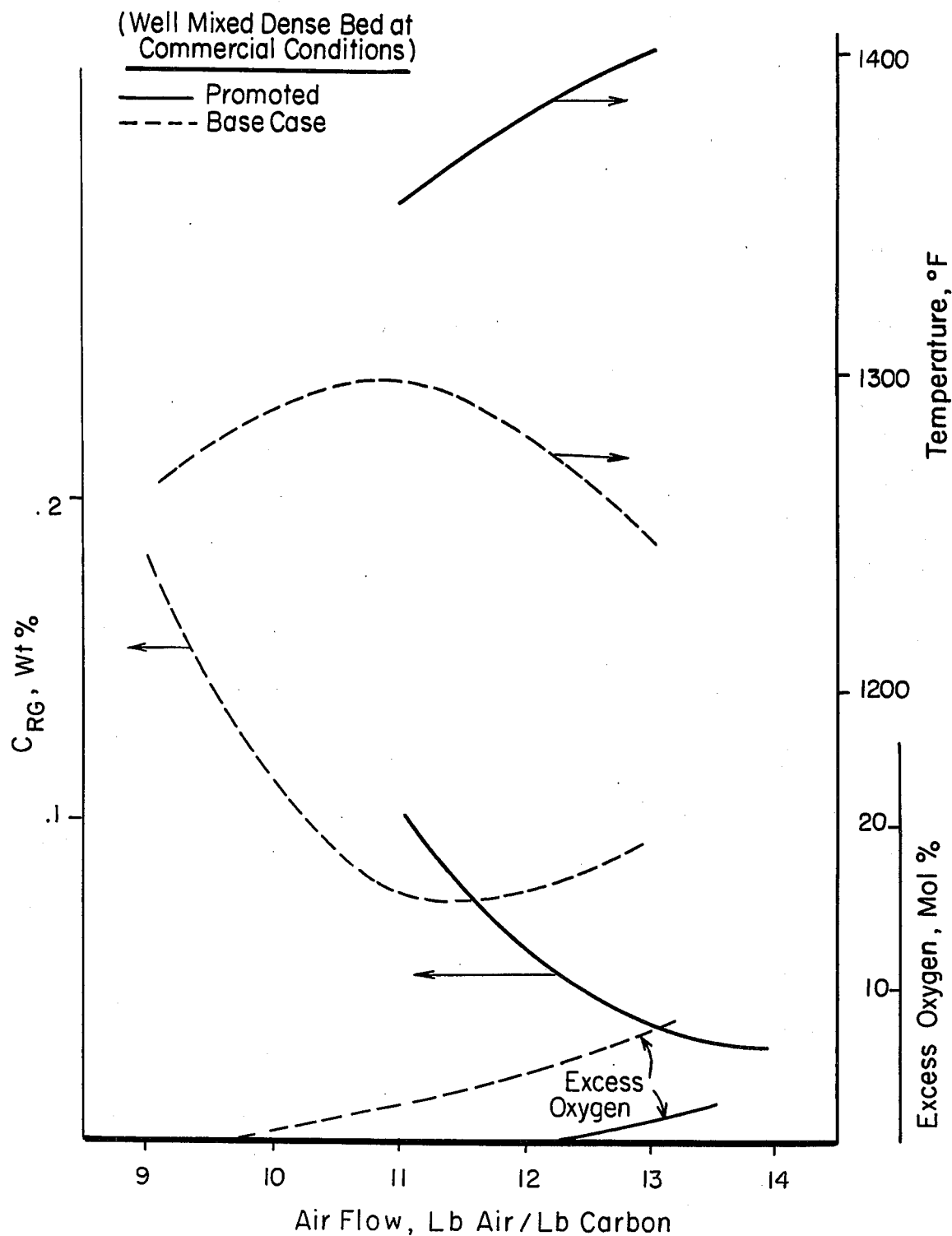
Figure 14:
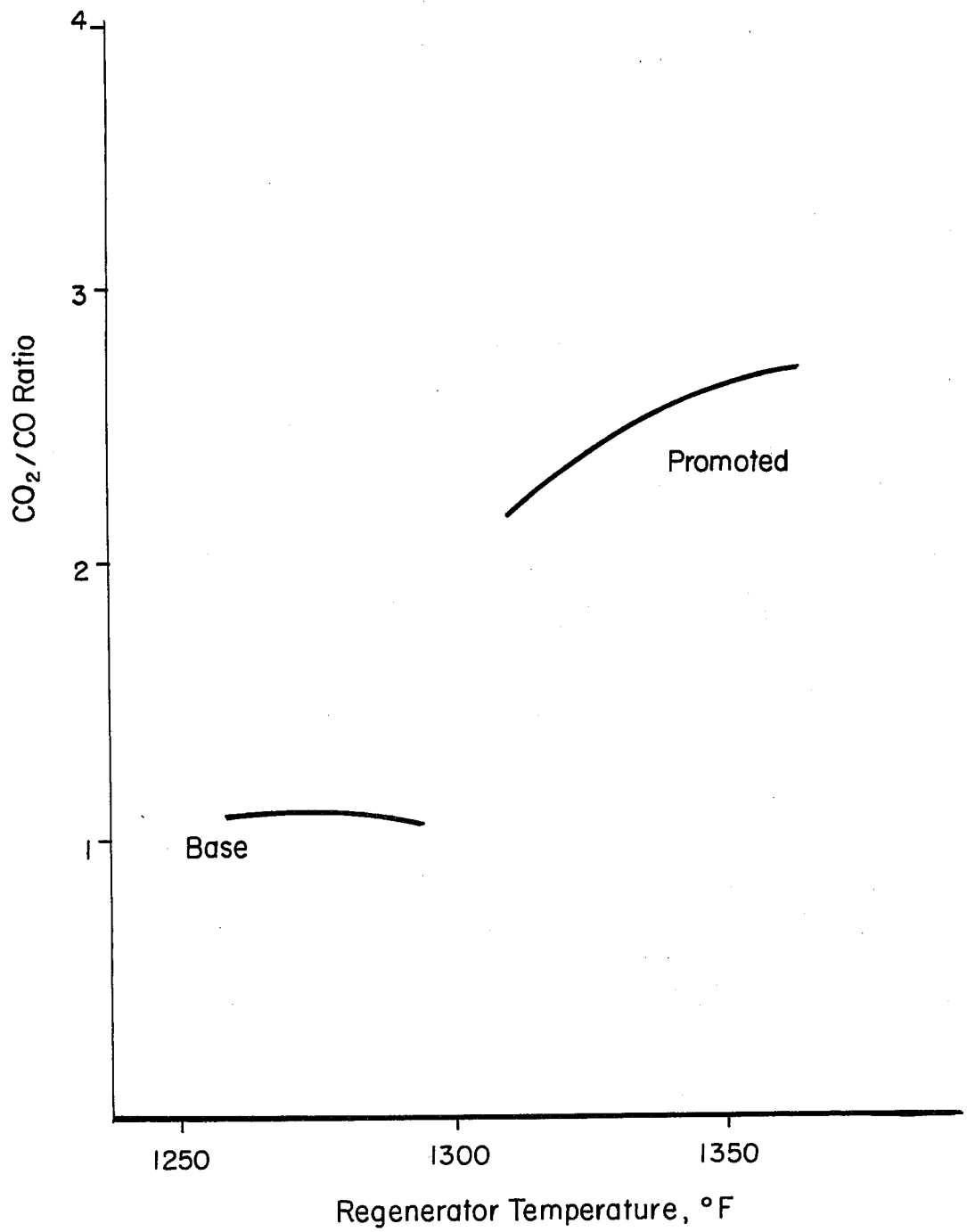

FIG. 12 represents only one specific aspect of regenerator performance shown for a constant air flow rate. For any level of promoter activity there is actually an entire range of regenerator operating conditions, depending on the particular air flow rate to the regenerator. In FIG. 13, the calculated regeneraor temperature, carbon and excess oxygen level above the dense bed are shown as a function of air rate, for 2 levels of CO oxidation activity (normal and promoted). These curves demonstrate that in the low air flow region where there is no excess oxygen the carbon tends to be higher for increased CO burning activity, due to competition between CO and carbon for available oxygen. At high air rate the curves cross since there is now excess oxygen available for both CO burning and carbon burning. Additionally the high CO activity catalyst has higher regenerator temperature associated with it. Associated with these curves are also the calculated $CO_2/CO$ ratios, which are shown versus dense bed regenerator temperature in FIG. 14. The lower curve for normal activity with no promoter shows flat behavior of $CO_2/CO$ as regenerator temperature is increased by increasing air flow rate. The curve for increased activity however, shows an increase in $CO_2/CO$ ratio as regenerator temperature is increased. Thus, use of the promoter allows greater range of control, by change of air flow rate, of $CO_2/CO$ ratio in the regenerator dense bed.

In addition to the dense bed kinetics, the burning in the dilute phase influences the $CO_2/CO$ ratio in the plenums. For low promoter activity, the dilute phase and cyclone temperatures rise extremely rapidly with increasing air rate due to the large CO concentrations unburned in the dense phase. The resulting temperature rise limits the range of $CO_2/CO$ ratio that can be obtained. As more promoter is introduced, burning more CO in the dense bed, less CO burning is necessary in the dilute phase and the air rate can be further increased without exceeding temperature constraints in the dilute phase and regenerator cyclones, and the $CO_2/CO$ can be varied over a wider range.

At still higher promoter concentration the dense bed CO combustion is increased and the air rate to the regenerator can be varied over a yet wider range without encountering hot cyclones. However, the lower limit on $CO_2/CO$ is now higher due to the intrinsic burning in the dense bed. Thus as promoter level is increased two effects occur simultaneously. First the CO combustion in the dense bed increases allowing more flexibility in air rate level due to less temperature fluctuation in the dilute phase and cyclones, with correspondingly more control over CO combustion in the dilute phase and higher attainable $CO_2/CO$ ratio. Second the lower bound on $CO_2/CO$ increases with increasing promoter level as the intrinsic CO burning in the dense bed becomes pronounced at lower air rates. FIG. 15 shows the $CO_2/CO$ ratios as a function of regenerator temperature, for different promoter levels. It can be seen that with intermediate levels of promoter activity the $CO_2/CO$ ratio can be controlled over wide ranges by varying air rate to vary regenerator temperature. For no CO promoter there is very little $CO_2CO$ control attained by varying air rate, and for high CO promoter level the $CO_2/CO$ ratio remains high even for low air rate.

There is thus an intermediate level of CO promoter activity that enables optimum operation of the regenerator over a wide range of temperaure and $CO_2/CO$ ratio without exceeding temperature constraints. In FIG. 16, the dense bed and hot cyclone temperatures calculated from the regenerator kinetics with a level of 0.5% excess oxygen in the plenum are shown for increasing levels of promoter activity. The region of insufficient activity corresponds to unacceptibly high cyclone temperature and little $CO_2/CO$ control, the intermediate activity region exhibits the $CO_2/CO$ ratio control shown in FIG. 15 with controllable cyclone temperatures, and the high region of activity corresponds to acceptable cyclone temperature but less $CO_2/CO$ ratio control. This region of activity is acceptable for complete CO combustion where no CO in the plenum is desired but is too high for partial CO burning.

As mentioned earlier, the swirl regenerators do not have uniform carbon distributions as a result of the catalyst flow pattern. This results in non-uniform CO and oxygen concentrations in the dilute phase above the dense swirl flow. Since the gas streams directly up with little lateral mixing, the non-uniformities result in regions locally of high oxygen concentration and other regions of high CO that do not intermix. Thermal burning that effects complete CO combustion for well mixed dense beds does not work for swirl units since the non-uniform dilute phase concentrations result in local regions of unburned CO even at high air rates with one or two cyclones becoming very hot while the others remain within temperature constraints. As the calculation shows, and as verified commercially, shifting the burning into the dense bed eliminates the hot cyclone and dilute phase constraints and thus permits complete CO burning without the necessity of changing the regenerator design to achieve a well mixed bed.

The activity of the CO promoter is not equivalent to the concentration of promoter added to the inventory, since the promoter continually decays in activity once introduced into the FCC unit, and promoter is also continually lost through normal attrition of the catalyst from the FCC unit.

The activity of the promoter in the unit is calculated from an estimate of the deactivation rate of promoter, as well as the rate of addition of promoted catalyst and the fresh activity of promoter. For a well mixed bed of constant inventory I with continual addition of promoter, an equation for the rate of change of promoter activity level can be written as $$\frac{d\epsilon_I}{dt} = \frac{M(\epsilon_m - \epsilon_I)}{I} - f\epsilon_I \tag{8}$$

and
, $I$ — catalyst inventory, tons
$M$ — makeup, tons/day
$f$ — deactivation constant, 1/days
$\epsilon_m$ — promoter activity, ppm
$\epsilon_I$ — activity in unit, ppm where the change in activity is the sum of addition rate of fresh promoter, withdrawal rate to maintain inventory, and deactivation rate of promoter.

The solution to this equation, in which $\epsilon_0$ is the activity in the unit at time=0 is $$\epsilon_I = \left[ M\epsilon_m - \left(e^{-\frac{M+If}{I}t}\right)((M\epsilon_m - \epsilon_o(M + If)) \right] \frac{1}{M + If} \tag{9}$$

gives the active promoter level for a given catalyst makeup rate, promoter addition level and decay rate.

This calculation may be repeated as the makeup rate and level of promoter change, resulting in a time history of the active promoter in the inventory. The active promoter level is maintained at any desired value by control of makeup rate and promoter level, and change in promoter activity is likewise controlled either by control of the addition rate or by concentration of promoter in the makeup. A study made in connection with Examples 46 and 47, supra, shows that with platinum as the active metal under the conditions given in the examples, the value for the decay of the activity is about six days (i.e. 95% loss of initial activity in 6 days).

Since the temperature differential between the dense bed and hot cyclones is an indication of the level of active promoter on the catalyst, as shown in FIG. 16, either the level of addition of promoter or the makeup rate can be adjusted in response to a signal from a temperature differential controller which normalizes the temperature differential for a standard excess oxygen level such as 0.5%.

The level of promoter added in a commercial unit and the active levels of promoter on the catalyst inventory are those necessary to permit control of $CO_2/CO$ ratio. The particular levels in each case are of course a function of the specific unit that the invention is practiced on and depend on catalyst makeup rate, total inventory in the unit, attrition of catalyst, deactivation rate of the promoter, regenerator operating conditions, chargestock properties, coke makeup of the unit and other variables.

The activity of promoter in the catalyst inventory may be controlled by controlling makeup rate or metal addition rate in response to control signals generated by temperature differentials within overall control of the desired temperature and $CO_2/CO$ level desired to maintain the unit at optimum performance.

In another embodiment contemplated as within the scope of this invention, very high makeup rate of promoted catalyst containing concentrations of promoter less than one ppm may also be practiced for short term use of the catalyst for CO combustion control.

As another embodiment of this invention, it is contemplated to utilize an automated or a semi-automated cracking unit provided with kinetic productive models or correlative models of the cracking section and the regeneration section to control the catalytic cracking in optimal fashion. It is much preferred to utilize kinetic predictive models for both sections. FIG. 17 illustrates a substantially completely automatic control system. The flow of oil feed, circulation of catalyst, and the flow of cracked products, air and flue gas are substantially as described for FIGS. 1 through 4. The common indicia used for FIG. 17 and FIGS. 1 through 4 signify the portions of the unit and flows defined earlier in this specification. Also included in FIG. 17 is an oil feed preheater 100 provided with a steam coil 101, the temperature of which is controlled by valve means 102 whereby controlling the temperature of the oil feed to riser 4.

Appropriate feed properties and the properties of the catalyst in the inventory in the unit are supplied in appropriate form, via information entry means 103, to the executive optimizer 104. Likewise, information on the desired product slate is entered via information entry means 105. Executive optimizer 104 is essentially a complete computer program containing subroutines including a kinetic predictive model of the reactor section of the unit, optimization subroutines for the reactor and regenerator sections, and decision-making subroutines for the selection of process conditions for optimal operation of the process for the product slate entered via 105. Lines 106 and 107 are cables which transmit signals to and from executive optimizer 104. In particular, the regenerator optimizer 108 interacts with the executive optimizer 104 via cable 106 to generate the operating maps or equivalents thereof, as described hereinabove and arrive at said optimal process conditions. The regenerator optimizer of course contains a model of the regenerator, preferably a kinetic predictive model as hereinabove described, and other appropriate subroutines. Decision on process conditions, as pneumatic or electrical signals, are passed from executive optimizer 104 to appropriate control elements via cables 106 and 107. For example, the control signal for oil preheat temperature, is measured by sensing means 108 and temperature controller 109 which places a signal on line 110 to the executive optimizer via cable 107 and is passed from executive optimizer 104 via cable 107, via line 111 to adjust control valve 102 and thus the feed preheat temperature. Similarly, the riser top temperature, measured by thermocouple 112 or other temperature measuring means, is set by a signal placed on cable 107 and passed via line 113 to adjust the set point of temperature controller 77. The temperature controller, in turn, places a signal on line 114 to adjust valve means 8 which controls catalyst circulation rate.

Thermocouple 115 and 116 provide measurements of the temperatures in the dilute phase and dense phase, respectively, of the regenerator. These measurement means apply signals on lines 117 and 118, respectively, to temperature difference controller 119 which interacts with the regenerator optimizer 119 to adjust the set points (not shown) of controller 119. Temperature difference controller 119 places a signal on line 121 adjusting valve 76 and thereby the rate of air flow in conduit 46.

Controller 119 places a signal on line 122 thereby adjusting valve means 123 thereby controlling the flow makeup CO-combustion promoter metal in conduit 124 to the dense bed of the regenerator. Although the makeup is shown to the regenerator dense bed, it equally well may be to any convenient part of the cracking unit wherein catalyst is circulated, such as conduits 4, 6, 36, 82 and elsewhere. Or, conduit 124 may be connected in a manner such as to introduce makeup metal promoter to the oil feed in conduit 2, or the air feed in conduit 46. Samples of the flue gas are provided to the CO and excess oxygen analyzer 75 via conduit signals generated by analyzer 75 are placed on line or cable 126 and passed to the regenerator optimizer 108 which controls the regenerator as hereinabove described. Optionally, a signal generated by optimizer 75 is placed on line 127 to adjust air-flow control means 76.

Another element of control which may advantageously be employed is recirculation of hot regenerated catalyst to the dense bed in the regenerator. This element of control is more fully described in U.S. patent application Ser No. 608,352 filed Aug. 27, 1975, the contents of which is herein incorporated by reference. In the embodiment of this control shown in FIG. 17, temperature difference controller 119 places a signal on line 127 causing adjustment of valve means 128 thereby controlling the rate of flow of hot regenerated catalyst in conduit 82.

Although FIG. 17 described a substantially completely automated novel method of control, it is to be understood that one or more of the elements indicated to be automatically adjusted, such as valve means 102 or 76, may be manually adjusted in response to readout devices inform the operator that adjustment is required. These and other departures from the described method of control may be made without departing from the spirit and content of this invention as described in this entire specification.

APPENDIX I

*C OPERATING CONDITIONS*
$CO_2/CO = 2$,

| | | | | | |
|---|---|---|---|---|---|
| FRESH FEED** | BPSO | 49999.97 | CAT. CIRC. RATE** | TONS/MIN | 50.09 |
| FRESH FEED | LBS/HR | 666522.19 | CAT./OIL RATIO | W(C)/W(0) | 8.51 |
| RECYCLE | LBS/HR | 39990.97 | AIR FLOW RATE | SCFM | 118186.31 |
| TOTAL FEED | LBS/HR | 706513.13 | AIR FLOW RATE | LBS/HR | 541056.81 |
| CURE FEED RATIO** | WEIGHT | 1.06 | | | |
| OIL TO RISER TEMP | DEG F | 299.68 | STEAM TO RISER** | LBS/HR | 7771.64 |
| RISER MIX TEMP** | DEG F | 1010.84 | STRIPPING STEAM | LBS/MLBS CAT | 2.49 |
| RISER TOP TEMP | DEG F | 980.11 | RISER INLET PRESS.** | PSIG | 29.30 |
| REGEN. TEMP | DEG F | 1267.31 | $O_2$ REG AIR OUTLET | MOLE PCT | 0.10 |
| AIR INLET TEMP** | DEG F | 400.00 | OIL PARTIAL PRESSURE | ATMS | 2.54 |
| CARBON ON REG. CAT. | WT PCT | 0.21 | REGENERATOR HOLDUP** | TONS | 100.00 |
| ADDITIVE CARBON** | LBS/HR | 8222.01 | REACTOR DENSE BED** | TONS | 0.0 |
| CARBON ON SPENT CAT. | WT PCT | 0.87 | CAT RESID. TIME RISER | SECS | 10.95 |
| UNSTRIPPED HC | LBS/HR | 4426.63 | CAT RES. TIME DENSE BED | SECS | 0.0 |
| CORE FORMED | LBS/HR | 47036.27 | CAT RES. TIME REGEN | MIN | 2.00 |
| | | | VAPOUR RES. TIME-RISER | SECS | 5.17 |
| HEAT OUT - $H_2O$ SPRAY | MMBTU/HR | 0.0 | VAPOUR VEL INLET | FT/SEC | 21.25 |
| HEAT INTO REGENRTOR | MMBTU/HR | 0.0 | VAPOUR VEL(CONE TOP) | FT/SEC | 31.56 |
| | | | PRESSURE (CONE TOP) | PSIG | 24.09 |
| CATALYST ACTIVITY | FAI | 68.00 | DENSITY (CONE TOP) | LBS/FT$^3$ | 2.74 |

*YIELDS*

| | OBSERVED WT PCT FF | PREDICTED WT PCT FF | PREDICTED VOL PCT FF | BPSO |
|---|---|---|---|---|
| $H_2S$ | 0.0 | 0.415 | 0.149FOE | 74.7BFOE |
| $H_2$ | 0.0 | 0.105 | 0.325FOE | 162.7BFOE |
| $Cl + C_2$ | 0.0 | 3.827 | 4.470FOE | 2235.2BFOE |
| $C_2^=$ | 0.0 | 1.275 | 1.402FOE | 701.0BFOE |
| $C_3$ | 0.0 | 1.830 | 3.297 | 1648.7 |
| $C_3^=$ | 0.0 | 3.570 | 6.255 | 3127.4 |
| $NO_4$ | 0.0 | 1.031 | 1.613 | 806.5 |
| $IC_4$ | 0.0 | 2.744 | 4.457 | 2228.7 |
| $C_4^=$ | 0.0 | 5.358 | 8.074 | 4036.9 |
| GASOLINE, 390 DEG-F AT 90 | 0.0 | 44.858 | 52.997 | 26498.3 |
| LFO, 603 DEG-F EP(THP) | 0.0 | 23.430 | 22.094 | 11047.0 |
| HFO (650+) | 95.500 | 0.000 | 0.000 | 0.0 |
| SLURRY OIL | 4.500 | 4.500 | 3.649 | 1824.3 |
| COKE | 0.0 | 7.057 | | |
| | | 100.000 | 108.783 | 54391.3 |
| LCO (RECYCLE) | | 2.002 | | |
| HCO (RECYCLE) | | 3.998 | | |
| TOTAL $C_5$ | 0.0 | 6.330 | 9.033 | |

APPENDIX I-continued

| | | | |
|---|---|---|---|
| CONVERSION, 390 DEG-F AT 90 | 0.0 | 72.070 | 74.257 |
| GASOLINE PLUS ALKYLATE | | | 76.976 |
| OUTSIDE IC$_4$ REQUIRED | | | 11.699 |

What is claimed is:

1. In a process for the fluid catalytic cracking of a hydrocarbon oil in the absence of added hydrogen to produce products boiling in the gasoline and the fuel oil range, said process comprising contacting said hydrocarbon oil with a regenerated, porous acidic solid catalyst in a cracking vessel under conditions effective to convert said oil to said products and deposit coke on said catalyst; transferring said coked catalyst to a regeneration vessel wherein in a dense fluid bed of catalyst is maintained at an elevated temperature and burning at least a portion of said coke in the presence of an oxygen containing gas with production of carbon dioxide and carbon monoxide in said dense bed, said production being characterized by a $CO_2/CO$ ratio; and recycling regenerated catalyst from said regeneration vessel to said cracking vessel to catalyze further cracking and supply at least part of the heat required for said cracking, the improvement in control of said regenerator which comprises:

selecting a temperature within the range of about 1200° to about 1350° F. for operation of said dense bed;

adding to said circulating catalyst a metal promoter selected from the group consisting of Pt, Pd, Rh, Ir, Os and Re in an amount effective to produce a $CO_2/CO$ ratio within the range of 1 to 6;

determining the deviation of the temperature of the dense bed with metal promoter from said selected temperature; and adjusting the flow rate of the oxygen containing gas in the direction to reduce said deviation.

2. The process claimed in claim 1 wherein said metal promoter comprises platinum.

3. The process claimed in claim 1 or 2 wherein the amount of promoter metal added is effective to produce a $CO_2/CO$ ratio within the range of 2 to 5.

4. In a process for the fluid catalytic cracking of a particular hydrocarbon oil in the absence of added hydrogen to produce products boiling in the gasoline and the fuel oil range, said process comprising contacting said hydrocarbon oil with a regenerated, particular porous acidic solid catalyst in a cracking vessel under conditions to convert said oil to lower molecular weight products, deposit coke on said catalyst, and deactivate said catalyst; transferring said deactivated catalyst to a regeneration vessel wherein a dense fluid bed of catalyst is maintained; burning at least a portion of said coke in the presence of an oxygen containing gas with production of carbon dioxide and carbon monoxide in said dense bed, said production being characterized by a $CO_2/CO$ ratio; and recycling hot regenerated catalyst from said regeneration vessel to said cracking vessel to catalyze further cracking and supply at least part of the heat required for said cracking; the improvement which comprises:

selecting a product to be maximized from the group of products consisting of gasoline, fuel oil, total cracked product, and a combination of these in predetermined proportions;

computing a set of operating conditions which maximize said selected product for said particular hydrocarbon oil to be cracked with said particular catalyst from a simulation of said process in which the $CO_2/CO$ ratio in said dense bed is allowed to vary from about 1.5 to about 100 or more, said operating conditions comprising reactor top temperature, hydrocarbon oil preheat temperature, air flow rate and $CO_2/CO$ ratio in said dense bed; and conducting said fluid catalytic cracking process in accordance with said computed set of values and with a catalyst inventory that contains Pt, Pd, Ph, Ir, Os or Re metal promoter in an amount sufficient to produce said calculated $CO_2/CO$ ratio.

5. The process described in claim 4 wherein said simulation comprises a kinetic predictive model of said conversion.

6. The process described in claim 5 wherein said porous, acid solid catalyst comprises a crystalline aluminosilicate zeolite having a pore size greater than about 6 Angstroms in diameter, and said metal promoter comprises platinum.

7. The process described in claim 5 wherein said set of values is computed from a simulation of said process in which the $CO_2/CO$ ratio in said dense bed is allowed to vary from about 1.5 to about 10.

8. The process described in claim 5 including the final step of adjusting one or more of said computed values by an EVOP procedure.

9. The process described in claim 4 wherein said computation of operating conditions is made with said $CO_2/CO$ ratio in said dense bed set at a value within the range of 2 to 5, and wherein the temperature of said dense bed is controlled by varying the flow rate of said oxygen containing gas.

10. The process described in claim 9 wherein said simulation comprises a kinetic predictive model of said process.

11. The process described in claim 10 wherein said porous, acid solid catalyst comprises a crystalline alumino-silicate zeolite having a pore size greater than about 6 Angstroms in diameter, and said metal promoter comprises platinum.

12. The process described in claim 9 or 10 or 11 including the final step of adjusting one or more said computed values by an EVOP procedure.

* * * * *

UNITED STATES PATENT AND TRADEMARK OFFICE
CERTIFICATE OF CORRECTION

PATENT NO. : 4,282,084
DATED : August 4, 1981
INVENTOR(S) : BENJAMIN GROSS and WOO YOUNG LEE It is certified that error appears in the above—identified patent and that said Letters Patent is hereby corrected as shown below:

| | |
|---|---|
| Col. 2, line 32 | "reverse result" should be underscored |
| Col. 6, line 7 | "throudh" should be --through-- |
| Col. 9, line 5 | "combustional" should be --combustion-- |
| Col. 9, line 51 | "furhtermore" should be --furthermore-- |
| Col. 9, line 66 | "ari" should be --air-- |
| Col. 10, line 37 | "variable" should be --variables-- |
| Col. 10, line 44 | "is" should be --in-- |
| Col. 11, line 6 | "zironia" (first occurrence) should be --zirconia-- |
| Col. 11, line 46 | "ntirates" should be --nitrates-- |
| Col. 11, lines 62-63 | "triiocdoiridium" should be --triiodoiridium-- |

UNITED STATES PATENT AND TRADEMARK OFFICE
CERTIFICATE OF CORRECTION

PATENT NO. : 4,282,084
DATED : August 4, 1981
INVENTOR(S) : BENJAMIN GROSS and WOO YOUNG LEE It is certified that error appears in the above—identified patent and that said Letters Patent is hereby corrected as shown below:

| | |
|---|---|
| Col. 11, line 64 | "rutherocene" should be --ruthenocene-- |
| Col. 12, line 2 | "irridium" should be --iridium-- |
| Col. 12, line 28 | "PT" should be --Pt-- |
| Col. 12, line 66 | "iun" should be --in-- |
| Col. 13, line 1 | "0.2% C" should be --0.2% wt. C-- |
| Col. 13, lines 14-15 | "an actual increase" should be underscored |
| Col. 12, line 14 | "parimarily" should be --primarily-- |
| Col. 15, line 20 | "separations" should be --separation-- |
| Col. 16, line 26 | "as" should be --gas-- |
| Col. 17, line 7 | after "flue" insert --gas-- |
| Col. 17, line 9 | "stream" should be --steam-- |
| Col. 17, line 39 | "spply" should be --supply-- |

UNITED STATES PATENT AND TRADEMARK OFFICE
CERTIFICATE OF CORRECTION

PATENT NO. : 4,282,084
DATED : August 4, 1981
INVENTOR(S) : BENJAMIN GROSS and WOO YOUNG LEE It is certified that error appears in the above—identified patent and that said Letters Patent is hereby corrected as shown below:

| | |
|---|---|
| Col. 19, line 8 | "performance" should be --performances-- |
| Col. 20, line 35 | "stage 2" should be --stage 1-- |
| Col. 23, line 48 | "on" should be --in-- |
| Col. 27, line 66 | "cm/min" should be --cc/min-- |
| Col. 28, line 6 | "shown" should be --show-- |

Col. 31, line 52

$$"\frac{d\tilde{a}}{dX} = \frac{1}{1+\tilde{K}_{Ah}C_{Ah}} \frac{P\,\overline{MW}}{RT} \frac{\Phi(t_c)\,C_cL}{G_v} K_a"$$

SHOULD READ $$--\frac{d\tilde{a}}{dX} = \frac{1}{1+K_{Ah}C_{Ah}} \frac{P\,\overline{MW}}{RT} \frac{\Phi(t_c)\,C_cL}{G_v} \tilde{K}\tilde{a}--.$$

| | |
|---|---|
| Col. 32, line 22 | "$\Delta H_j$" should be --$\Delta H_i$-- |
| Col. 32, line 50 | after "$\alpha$" insert --co-- |

UNITED STATES PATENT AND TRADEMARK OFFICE
CERTIFICATE OF CORRECTION

PATENT NO. : 4,282,084

DATED : August 4, 1981

INVENTOR(S) : BENJAMIN GROSS and WOO YOUNG LEE

It is certified that error appears in the above—identified patent and that said Letters Patent is hereby corrected as shown below:

| | |
|---|---|
| Col. 33, line 21 | After the sentence ending "(3) and (4)" insert the following footnote: --In equations 4, 5 and 6, $C_{rg}$ is level of carbon on regenerated catalyst, $H_{rg}$ the regenerator inventory. $E_{cb}$ the activation energy for carbon burning, $T_{rx}$ the reactor top temperature, $F_c$ the catalyst flow rate, $T_a$ the air inlet temperature, $\Lambda$ the mols of hydrogen in the coke and $\Delta H_{H2}$, $CO_2$, CO are the heats of combustion of hydrogen, $CO_2$ and CO.-- |
| Col. 34, lines 4-5 | "This typical case can be calculated in less than 20 seconds" should be underscored |
| Col. 35, line 4 | "lowr" should be --lower-- |
| Col. 35, line 39 | "6" should be underscored |
| Col. 35, line 58 | "regeneraor" should be --regenerator-- |

UNITED STATES PATENT AND TRADEMARK OFFICE
CERTIFICATE OF CORRECTION

PATENT NO. : 4,282,084

DATED : August 4, 1981

INVENTOR(S) : BENJAMIN GROSS and WOO YOUNG LEE

It is certified that error appears in the above—identified patent and that said Letters Patent is hereby corrected as shown below:

| | |
|---|---|
| Col. 36, line 17 | "concentrations" should be --concentration-- |
| Col. 37, line 42 | "$\{$ 0" should be --$\{$ o-- |
| Col. 37, line 43 | "O" should be --o-- |
| Col. 37, line 54 | "active" first occurrence should be underscored |
| Appendix I | "*C" should be --*FCC-- |
| Col. 42, line 25 | "Ph" should be --Rh-- |

Signed and Sealed this

Seventh Day of December 1982

[SEAL]

Attest:

Attesting Officer

GERALD J. MOSSINGHOFF

Commissioner of Patents and Trademarks